United States Patent [19]

Takagi et al.

[11] Patent Number: 5,430,547
[45] Date of Patent: Jul. 4, 1995

[54] NON-CONTACTING POSITION DETECTING APPARATUS

[75] Inventors: Kiyoshi Takagi; Toshio Kurihara; Shoichi Kuwahata, all of Saitama; Kazuo Ohomori, Chiba; Atsumi Toyama, Saitama; Takeshi Oba, Tokyo, all of Japan

[73] Assignee: Honda Giken Kogyo Kabushiki Kaisha, Tokyo, Japan

[21] Appl. No.: 14,677

[22] Filed: Feb. 8, 1993

[30] Foreign Application Priority Data

Apr. 7, 1992 [JP] Japan ................... 4-113954

[51] Int. Cl.⁶ .............................................. G01B 11/14
[52] U.S. Cl. ........................... 356/375; 356/376; 33/503; 33/707
[58] Field of Search ............... 356/372, 373, 375, 376; 250/561; 33/503, 546, 551, 555, 707; 901/46, 47

[56] References Cited

U.S. PATENT DOCUMENTS

| | | | |
|---|---|---|---|
| 3,678,584 | 7/1972 | Dolan | 33/503 |
| 3,722,842 | 3/1973 | Schweizer | 248/124 |
| 4,102,051 | 7/1978 | Reiff et al. | 33/174 P |
| 4,149,317 | 4/1979 | Reiff et al. | |
| 4,282,654 | 8/1981 | Reiff et al. | 33/1 M |
| 4,838,696 | 6/1989 | Pryor | 356/375 |
| 5,118,192 | 6/1992 | Chen et al. | 356/372 |
| 5,238,054 | 8/1993 | Ritz et al. | 165/71 |
| 5,291,270 | 3/1994 | Koch et al. | 356/375 |

FOREIGN PATENT DOCUMENTS

| | | | |
|---|---|---|---|
| 2609670 | 12/1977 | Germany. | |
| 2613451 | 3/1978 | Germany. | |
| 2008948 | 8/1978 | Germany. | |
| 0190607 | 10/1984 | Japan | 356/376 |
| 0029710 | 2/1986 | Japan | 356/376 |
| 5164525 | 6/1993 | Japan | 356/375 |

*Primary Examiner*—Hoa Q. Pham

[57] ABSTRACT

A non-contacting position detecting apparatus includes a laser unit having a light emitting portion and a light receiving portion for irradiating laser light upon a detection point of a subject for measurement and receiving laser light reflected from the detection point to recognize the distance to the detection point. An arm is capable of moving the laser unit in the direction of at least one axis of a rectangular coordinate system. A coordinate detecting member is provided for detecting coordinates of the arm. Coordinates of the detection point are recognized in accordance with the coordinates of the arm when the positional relationship between the detection point and the laser unit reaches a predetermined relationship. The laser unit includes a needle-like indicating member for indicating the crossing point between extension lines of an optic axis of laser light radiated from the light emitting portion and an optic axis of laser light received by the light receiving portion when the detection point and the laser unit reach the predetermined positional relationship.

14 Claims, 23 Drawing Sheets

Fig. 20 (a)
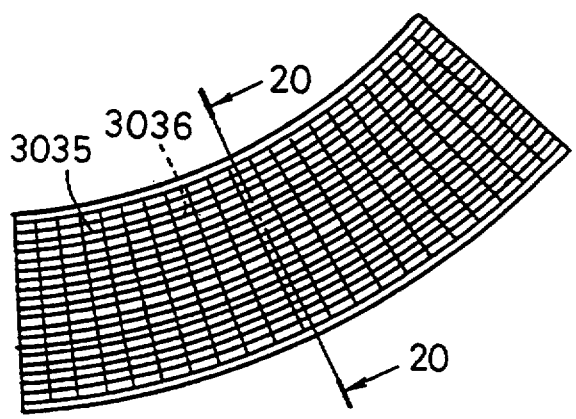
Fig. 20 (b)
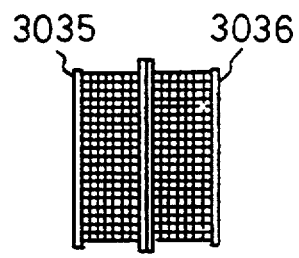
Fig. 21 (a)
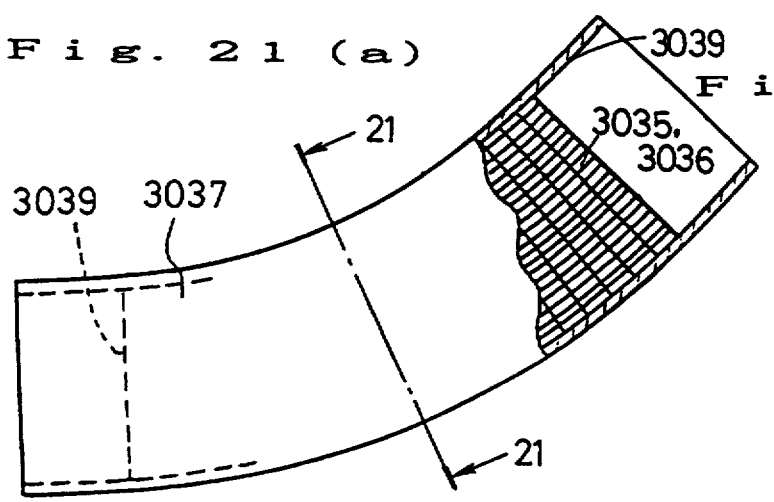
Fig. 21 (b)
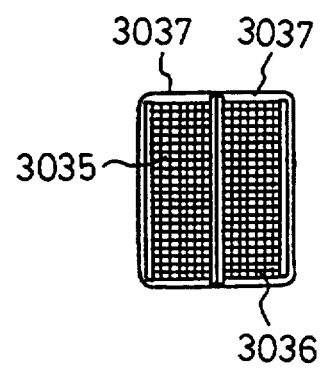
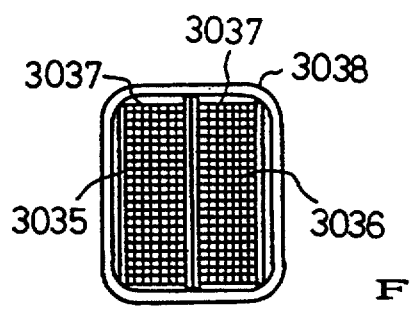
Fig. 22

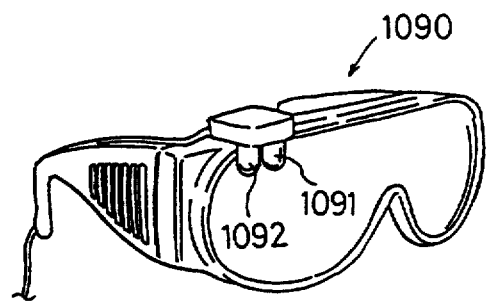
Fig. 29
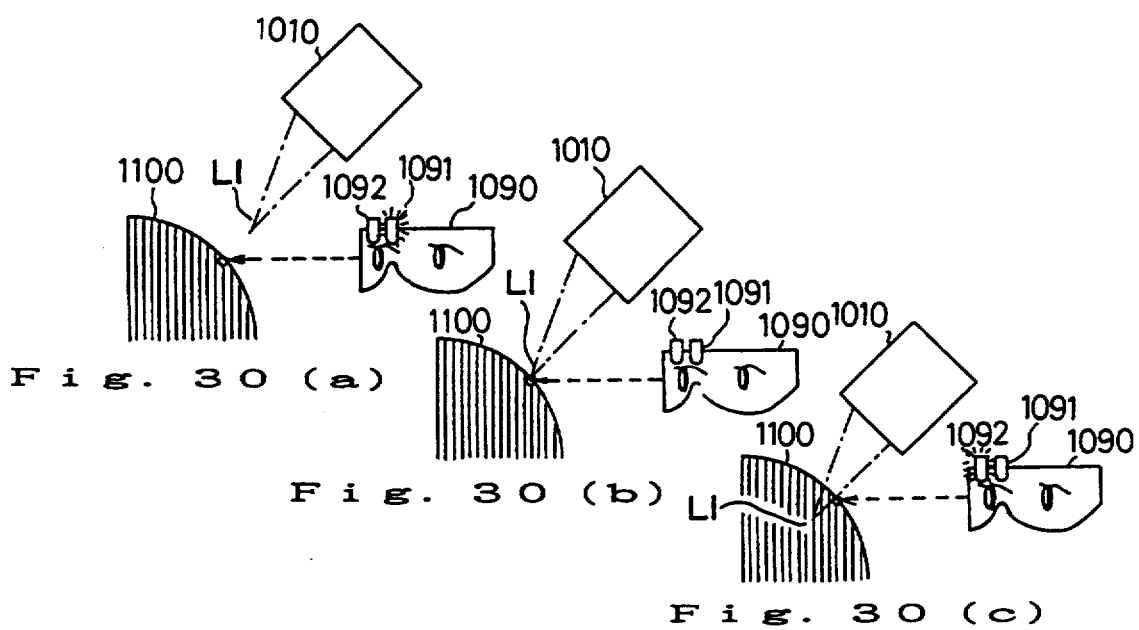
Fig. 30 (a)
Fig. 30 (b)
Fig. 30 (c)

POSITIONAL RELATIONSHIP BETWEEN SPOTS

POSITIONAL RELATIONSHIP BETWEEN SPOTS

POSITIONAL RELATIONSHIP BETWEEN SPOTS

NON-CONTACTING POSITION DETECTING APPARATUS

BACKGROUND OF THE INVENTION

1. Field of the Invention

The present invention relates to a non-contacting position detecting apparatus, and particularly to a non-contacting position detecting apparatus suitable for use with a non-contacting three-dimensional measuring instrument which can perform a reliable and accurate measurement of coordinates of various portions of an outer profile of a subject to be measured.

2. Description of Background Art

Three-dimensional measuring instruments which detect a three-dimensional shape as three-dimensional coordinate data are disclosed, for example, in U.S. Pat. Nos. 3,722,842, No. 4,102,051, No. 4,149,317 and No. 4,282,654.

The three-dimensional measuring instruments include a body (arm) movable in the directions of axes of coordinates of a spatial rectangular coordinate system, that is, X, Y and Z axes which are perpendicular to each other, and a needle provided on the movable body. The needle contacts with a detection point of an outer profile of a subject for measurement to detect three-dimensional coordinates of the movable body upon such contacting to measure a three-dimensional profile.

However, with such contacting three-dimensional measuring instruments, where the subject for measurement is molded from a soft material such as, for example, clay, when an end of the needle is contacted with the detection point of the subject for measurement, the end is liable to bite into the subject for measurement so that an error is produced in detected coordinates of the subject for measurement. There is the possibility that concave and convex measurements may be produced on the outer profile of the subject for measurement.

In order to eliminate such a disadvantage, the three-dimensional measuring instrument should be of the non-contacting type wherein, for example, a laser light source and a light receiving element are used for receiving a reflected laser beam, the distance between the subject for measurement and the laser light source is measured and, at a point in time when the distance reaches a predetermined value, coordinates of the detection point of the subject for measurement are measured.

With a contacting three-dimensional measuring instrument, when the needle is directed perpendicularly to a predetermined position of the surface of a subject for measurement, coordinates of the position can be detected accurately. Accordingly, in such a non-contacting three-dimensional measuring instrument as described above, detection of coordinates is performed using such a customary technique.

The technique of detection of coordinates described above is described with reference to FIGS. 7(a) and 7(b). Referring to FIGS. 7(a) and 7(b), the Y-axis is disposed in a direction perpendicular to the plane of the figure. A subject for measurement 100 is provided adjacent to a laser unit 10 having a laser light source and a light receiving element for a laser beam disposed therein for detecting the distance to the subject 100 for measurement in a non-contacting condition.

The structure of the laser unit 10 is shown in FIG. 12. Laser light radiated from a semiconductor laser 12, which is a light emitting element, is irradiated upon the subject 100 for measurement. When the subject 100 for measurement is disposed at a reference point Lref (for example, at the distance of 50 mm in the laser light irradiation direction from the laser light irradiation position of the laser unit 10), laser light reflected at random from a detection point of the subject 100 for measurement is received at a central position of a light receiving element 15. Further, when the position of the subject 100 for measurement is nearer (100A) or farther (100B) than the reference point, Lref, the light receiving position of laser light on the light position detecting element 15 moves in the direction of an arrow mark A or B. The output of the light position detecting element 15 is outputted to a first signal processing circuit 50, as illustrated in FIG. 6.

When measurement is performed using such a laser unit 10, as shown in FIG. 7(a), the mounting position of the laser unit 10 is set so that laser light 10A irradiated from the laser unit 10 is irradiated substantially perpendicularly upon a portion (detection point) of the subject 100 for measurement whose coordinates are to be detected, and thereafter, the laser unit 10 is fed in the X and Z directions simultaneously so that the laser unit 10 may move in the irradiation direction (the direction of an arrow mark L) of the laser light. When the laser unit 10 is moved closer to the subject 100 for measurement as shown in FIG. 7(b), laser light 10B reflected from the subject 100 for measurement is detected by way of a lens system. When the light detected from a result of the detection that the laser unit 10 comes to a predetermined distance from the laser unit 10, coordinate data of the laser unit 10 or of an arm (not shown) which supports the laser unit 10 thereon are then collected as coordinate data corresponding to the laser light irradiation position (detection point) of the subject 100 for measurement.

As illustrated in FIGS. 19(a) to 19(c), a light emitting portion 101A and a light receiving portion 101B are provided for the laser light. As shown in FIG. 19(a), the mounting position of the laser unit 101 is set so that laser light irradiated from the light emitting portion 101A of the laser unit 101 is irradiated substantially perpendicularly upon a portion of the subject 100 wherein the coordinates are to be measured. Thereafter, the laser unit 101 is fed in the X and Z directions simultaneously so that the laser unit 101 may move in the irradiation direction (the direction of an arrow mark L) of the laser light. When the laser unit 101 is moved closer to the subject 100 for measurement as shown in FIG. 19(b), laser light reflected from the subject 100 for measurement is detected by way of a lens system provided at the light receiving portion 101B. When the light is detected from a result of the detection that the laser unit 101 has arrived at a predetermined distance from the laser unit 101, coordinate data of the laser unit 101 or of an arm (not shown) which supports the laser unit 101 thereon is collected as coordinate data corresponding to the laser light irradiation position of the subject 100 for measurement.

SUMMARY AND OBJECTS OF THE PRESENT INVENTION

With the non-contacting three-dimensional measuring instrument of the construction described above, since it does not include means for indicating such a desired detection point as corresponds to a needle of a contacting three-dimensional measuring instrument, it is difficult to designate a desired detection point rapidly and accurately. Accordingly, when it is tried to continuously measure a plurality of detection points on a curved line of a subject for measurement which has, for example, a curved profile, there is a problem that the operability is very inferior compared with that of a contacting three-dimensional measuring instrument.

It is an object of the present invention to make it possible to designate a desired detection point rapidly and accurately with a non-contacting position detecting apparatus solving the problems of the prior art described above.

In order to attain the object of the present invention, a non-contacting position detecting apparatus which includes a laser unit having a light emitting portion and a light receiving portion for irradiating laser light upon a detection point of a subject for measurement and receiving laser light reflected from the detection point to recognize the distance to the detection point is characterized in that the laser unit includes needle-like indicating means for indicating the crossing point between extension lines of an optic axis of the laser light radiated from the light emitting portion and an optic axis of laser light received by the light receiving portion when the detection point and the laser unit reach the predetermined positional relationship.

Since the needle-like indicating means described above is provided on the laser unit, if the laser unit is moved so that the needle-like indicating means may indicate a detection point, then the positional relationship between the detection point and the laser unit comes to the predetermined relationship, and accordingly, the desired detection point can be designated rapidly and accurately.

In a system wherein the irradiation direction L of laser light is directed perpendicularly to a predetermined surface of an outer profile of a subject for measurement and a laser unit is moved in the irradiation direction as described above, the laser unit 101 must necessarily be moved in the directions of two axes (the X-axis and the Z-axis in the example of FIGS. 19(a) to 19(c)) or in the directions of three axes simultaneously. In short, in order to move the laser unit 101 from the condition of FIG. 19(a) to the condition of FIG. 19(b), the laser unit 101 must necessarily be fed by xf in the X direction and by yf in the Y direction simultaneously as shown in FIG. 19(c). Such simultaneous feeding of the laser unit 101 in the directions of a plurality of axes not only makes the mechanism much more complicated but also reduces the operability.

Meanwhile, in a method wherein the simultaneous feeding described above is performed separately (for example, feeding by xf in the X direction is performed first, and then, feeding by yf in the Y direction is performed) or another method wherein feeding in the X direction and feeding in the Y direction are performed alternately little by little. There is the possibility that, at the point in time when the laser unit 101 comes to a predetermined distance to the subject 100 for measurement (that is, at a point in time when coordinates are detected) the irradiation position of laser light may be a different position from an aimed position to be detected. In this instance, coordinates of the aimed position cannot be detected. It is an object of the present invention to provide a non-contacting three-dimensional measuring instrument which can readily effect detection of coordinates of a desired (aimed) position of a subject for measurement.

In order to solve the problems described above, a non-contacting three-dimensional measuring instrument is constructed using a main shaft provided on an arm of a layout machine such that the direction of the center axis thereof extends in the direction of one of axes of the coordinates of a spatial rectangular coordinate system, a first intermediate arm provided for pivotal motion on the main shaft, an auxiliary shaft provided on the first intermediate arm at an angle of 45 degrees with respect to the main shaft, a second intermediate arm provided for pivotal motion on the auxiliary shaft, and laser unit mounting means for mounting the laser unit on the second intermediate arm such that the direction of laser light irradiated from the laser unit makes an angle of 45 degrees with respect to the auxiliary shaft.

The non-contacting three-dimensional measuring instrument includes a laser unit mounting means constructed such that a point (hereinafter referred to as "reference point") at a predetermined distance in the laser light irradiation direction from the laser unit, which is positioned for making a reference for collecting coordinates, may be positioned at the crossing point between the main shaft and the auxiliary shaft.

The non-contacting three-dimensional measuring instrument includes a laser unit constructed so as to provide an irradiate laser light from a position other than a central portion thereof, the laser unit mounting means is constructed such that it can mount the laser unit reversely with regard to the front and rear sides.

The non-contacting three-dimensional measuring instrument includes a first intermediate arm having a core member made of an epoxy honeycomb, a pair of bearings disposed at the opposite ends of the core member and carbon fibers wound on the surfaces of the core member and the bearings.

With the non-contacting three-dimensional measuring instrument according to the present invention, the laser light irradiation direction can be directed to all of the directions of the three axes constituting the coordinate system by adjusting the pivoting angle of the first intermediate arm with respect to the main shaft and the pivoting angle of the second intermediate arm with respect to the auxiliary shaft.

With the non-contacting three-dimensional measuring instrument according to the present invention, if the position of the arm of the layout machine does not vary, the coordinates of the reference point are not varied even if the first intermediate arm and/or the second intermediate arm are pivoted to vary the irradiation direction of laser light.

With the non-contacting three-dimensional measuring instrument according to the present invention, if the laser unit is mounted reversely with the front side positioned on the rear side, measurement of coordinates can be performed in the proximity of a wall face of a recessed portion of the surface of the subject for measurement.

With the non-contacting three-dimensional measuring instrument according to the present invention, the first intermediate arm can be constructed light and firmly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 20(a) is a front elevational view of a pair of epoxy honeycombs constituting the intermediate arm and FIG. 20(b) is a sectional view thereof taken along line 20—20 of FIG. 20(a);

FIG. 21(a) is a view illustrating a manner in which carbon fibers are adhered to the pair of epoxy honeycombs and FIG. 21(b) is a sectional view taken along line 21—21 of FIG. 21(a);

FIG. 22 is a view, similar to FIG. 21(b), illustrating the carbon fibers being adhered to the pair of epoxy honeycombs;

FIG. 29 is a perspective view of a pair of laser light protective goggles;

FIGS. 30(a), 30(b) and 30(c) are views illustrating the coordinate measuring techniques using the laser light protective goggles;

DETAILED DESCRIPTION OF THE PREFERRED EMBODIMENTS

Figure 1:
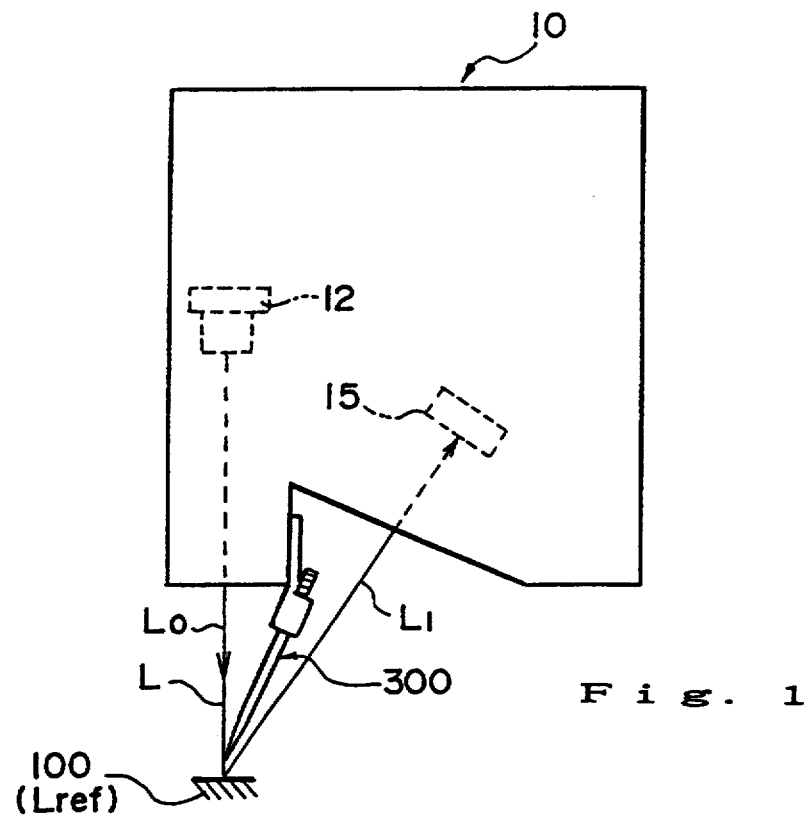
FIG. 1 is a schematic view of a laser unit 10 according to an embodiment of the present invention.

In the following, the present invention will be described in detail with reference to the drawings. FIG. 1 illustrates the construction of a principal portion of a laser unit 10 to which the present invention is applied. A needle-like indicating means 300 is provided for indicating a desired detection point on a subject 100 for measurement.

Figure 2:
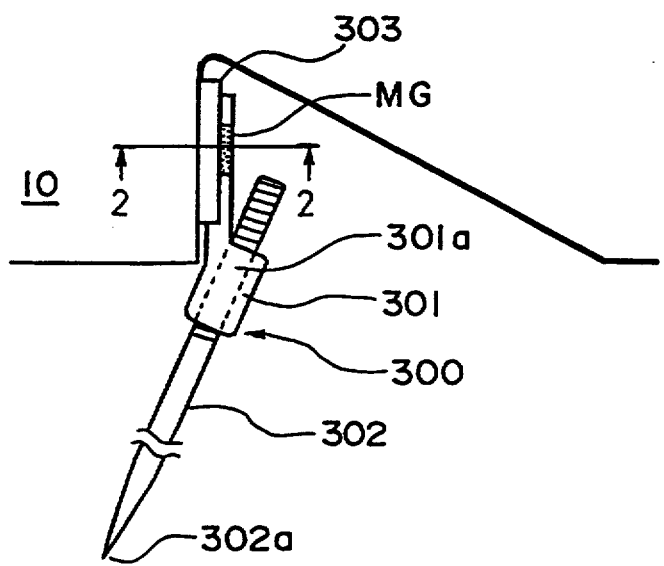
FIG. 2(a) is an enlarged view of the principal portion illustrated in FIG. 1
FIG. 2(b) is a sectional view taken along line 2—2 of FIG. 1.
Figure 2:
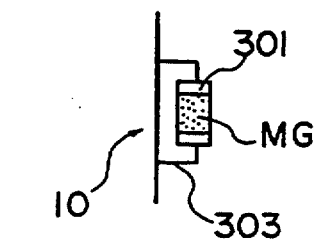

FIG. 2(a) is an enlarged view showing the construction of the needle-like indicating means 300 in detail, and FIG. 2(b) is a sectional view taken along line 2—2 of FIG. 2(a). The needle-like indicating means 300 includes a base plate 303 securely mounted, for example, on the laser unit 10, a supporting portion 301 having a tapping hole 301a, and a needle 302 screwed at a rear end portion thereof in the tapping hole 301a of the supporting portion 301 and having an end portion of a tapered profile.

Figure 4:
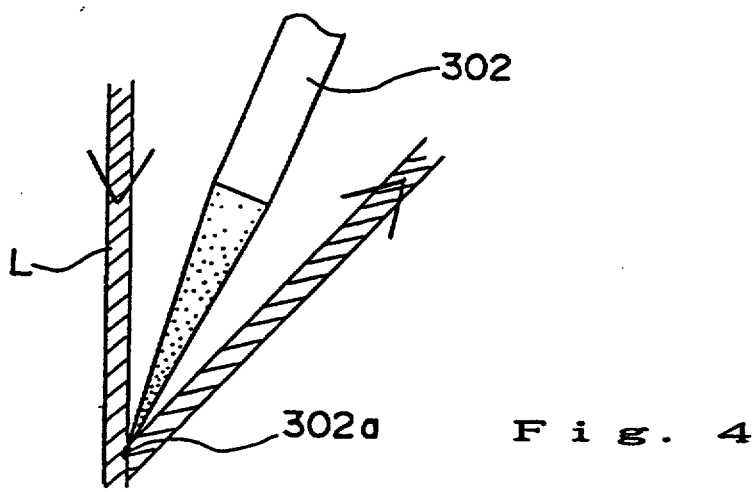
FIG. 4 is an enlarged view of an end portion of a needle 302.

The base plate 303 and the supporting portion 301 are secured to each other by a weak restraining force so that, when the needle 302 collides with the subject 100 for measurement, they may be spaced away from each other readily to prevent damage to the subject 100. The securing by such a weak restraining force can be achieved, for example, by a magnetic force such as a magnet MG. As illustrated in FIGS. 1 and 4, the end tip 302a of the needle 302 is pointed.

Figure 6:
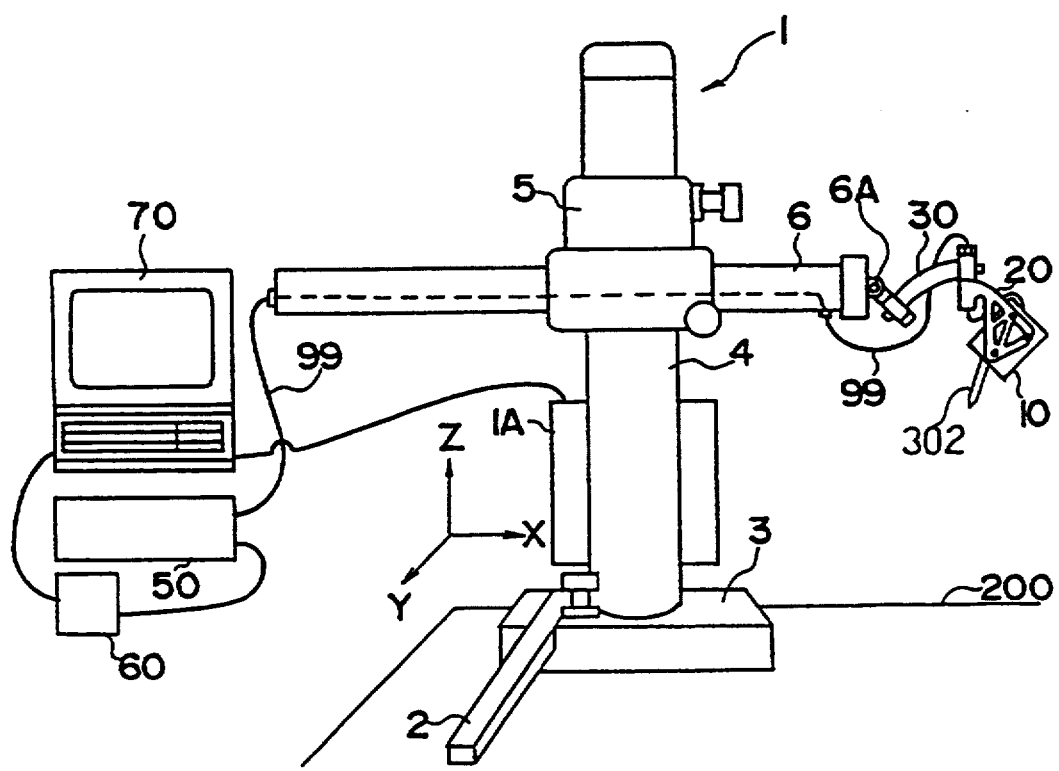
FIG. 6 is a schematic view of a non-contacting measuring instrument according to an embodiment of the invention.
Figure 7A:
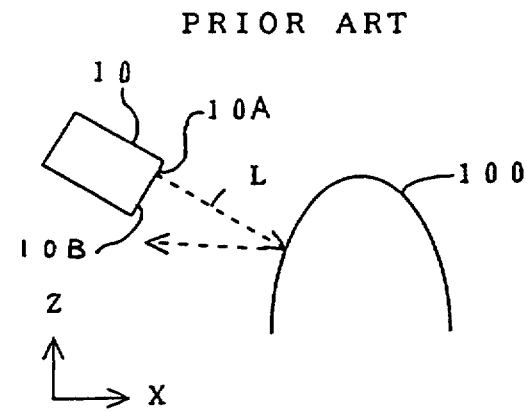
FIG. 7(a) and 7(b) are views illustrating conventional techniques for detecting coordinates.
Figure 7B:
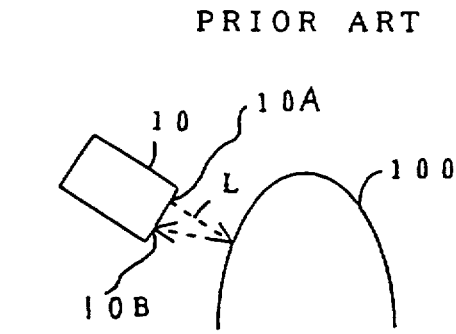

FIG. 6 illustrates a non-contacting three-dimensional measuring instrument provided with the laser unit 10 described above, and like reference characters to those described above denote like or equivalent portions. In the following, the present invention will be described by applying the invention to the non-contacting three-dimensional measuring instrument, but the present invention is not limited to this and can be applied similarly to a one-dimensional measuring instrument for measuring the length of a subject 100 for measurement in a one-dimensional direction in a non-contacting condition or a two-dimensional measuring instrument for measuring the lengths in two-dimensional directions in a non-contacting condition.

Referring to FIG. 6, a layout machine 1 is installed on a surface plate 200, and a guide rail 2 thereof is secured to the surface plate 200. A base plate 3 of the layout machine 1 is slidably movable in the Y direction along the guide rail 2, and a sliding frame 5 is slidably movable in the Z direction along a vertical arm 4 supported vertically on the base plate 3. Further, a horizontal arm 6 is slidably movable in the X direction along the sliding frame 5.

A laser unit 10 is mounted at an end of the horizontal arm 6 by way of an intermediate arm (first intermediate arm) 30 and a wing arm (second intermediate arm) 20. The mounting of the wing arm 20 and the laser unit 10 may be, for example, by screwing.

Accordingly, the laser unit 10 is movable to a suitable location within a three-dimensional spacing above the surface plate 200 by sliding movements of the base plate 3, the sliding frame 5 and the horizontal arm 6 in the respective directions described above. The movement of the laser unit 10, that is, the sliding movements of the base plate 3, the sliding frame 5 and the horizontal arm 6 in the respective directions described above, can be performed by a suitable known technique by means of a motor or by a manual operation or the like.

A cable 99 connected to the laser unit 10 is connected to a first signal processing circuit 50 described above. The first signal processing circuit 50 outputs, depending upon a difference of the light receiving position of laser light on the light position detecting element 15, an analog signal corresponding to the distance between the laser unit 10 and the subject 100 for measurement. For the laser unit 10 and the first signal processing circuit 50, for example, a laser displacement gage (LC-2320) and a controller (LC-2100) manufactured by Keyence Kabushiki Kaisha can be used.

The first signal processing circuit 50 is connected to a personal computer 70. A second signal processing circuit 60 includes a time constant circuit for applying output delaying processing for prevention of chattering to an output signal (for example, a signal of a distance between the laser unit 10 and the subject for measurement) of the first signal processing circuit 50, an invertor circuit and so forth. It is to be noted that the second signal processing circuit 60 can be omitted in accordance with a responding condition, a polarity or the like of the output signal of the first signal processing circuit 50.

The layout machine 1 includes a coordinate detecting apparatus 1A for detecting coordinates of the horizontal arm 6 (in other words, coordinates of the reference point L1), and the output signal thereof is outputted to the personal computer 70. The personal computer 70 automatically collects coordinates of the reference point L1 which are an output signal of the coordinate detecting apparatus 1A at a point in time when the subject 100 for measurement reaches the reference point L1 using the output signal of the second signal processing circuit 60 (or the first signal processing circuit 50), and reproduces, in accordance with the requirements, the shape of a profile of the subject for measurement on a CRT using the collected coordinate information. The automatic collection of coordinates will be hereinafter described.

Figure 13:
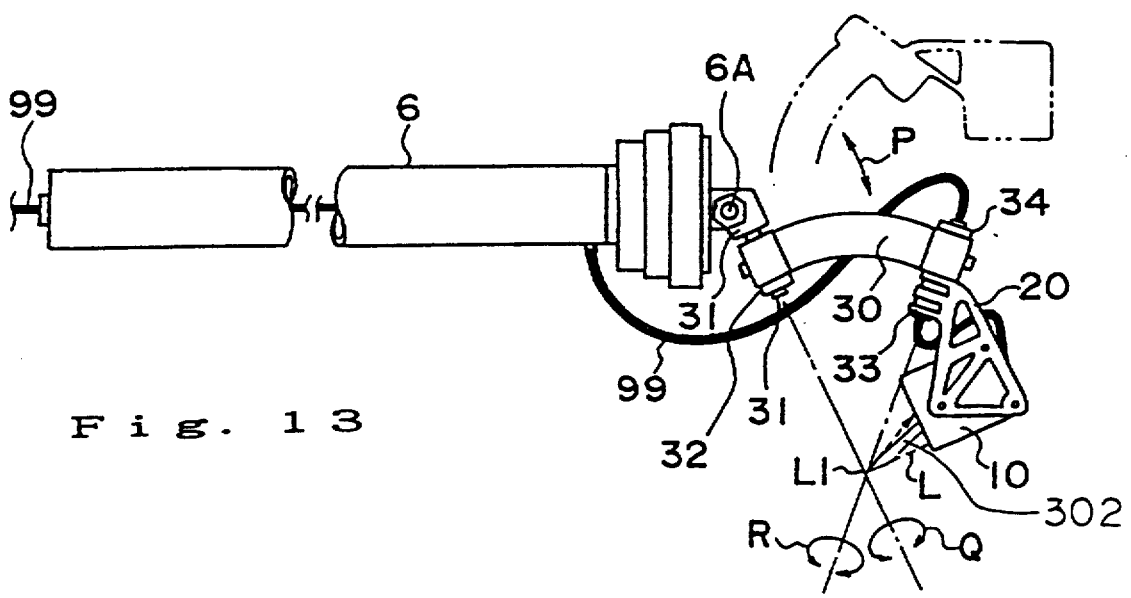
FIG. 13 is a partial enlarged view of FIG. 6.

FIG. 13 is a front elevational view of the horizontal arm 6 and the intermediate arm 30, wing arm 20 and laser unit 10 mounted on the horizontal arm 6. A pair of bearings 32 and 34 are securely mounted at the opposite ends of the intermediate arm 30, and a main shaft 31 and an auxiliary shaft 33 are inserted for rotation in the bearings 32 and 34. The main shaft 31 is secured to a shaft 6A mounted for rotation at an end of the horizontal arm 6 while the auxiliary shaft 33 is secured to the wing arm 20.

Accordingly, an end portion is farther than the main shaft 31 and the intermediate shaft 30 can be pivoted in the direction indicated by an arrow mark P around the shaft 6A. An end portion farther than the intermediate arm 30 can be pivoted in the direction indicated by an arrow mark Q around the main shaft 31. In addition, an end portion farther than the wing arm 20 can be pivoted in the direction indicated by an arrow mark R around the auxiliary shaft 33. The pivotal portions are fixed using a suitable known technique upon measurement of coordinates by the present non-contacting three-dimensional measuring instrument.

Figure 5:
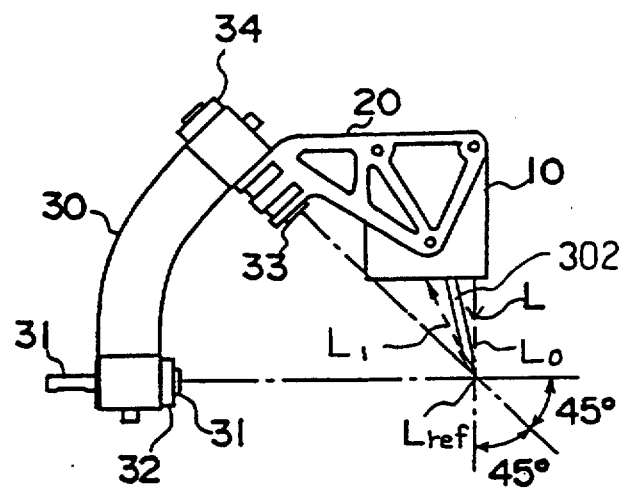
FIG. 5 is a partial enlarged view of FIG. 6.

Now, as shown in FIG. 5, the main shaft 31 and the auxiliary shaft 33 provided on the intermediate arm 30 are mounted such that the angle defined by extension lines of the center axes thereof may be 45 degrees. The needle 302 is installed within the region defined between extension lines of an optic axis Lo of laser light radiated from the light emitting portion and an optic axis L1 of laser light received by the light receiving portion when the detection point is at the reference point Lref.

Since originally the region is a region which is assured as a dead spacing into which no cables or the like are admitted in order that laser light may be irradiated with certainty upon a subject for measurement and laser light reflected from the subject for measurement may be received with certainty, if the needle 302 is provided in the region, then the needle 302 will not be connected to cables or the like.

Meanwhile, the laser unit 10 is mounted on the wing arm 20 such that laser light L irradiated in the direction of an arrow mark from the laser unit 10 may make an angle of 45 degrees with respect to the center axis of the auxiliary shaft 33.

Figure 10:
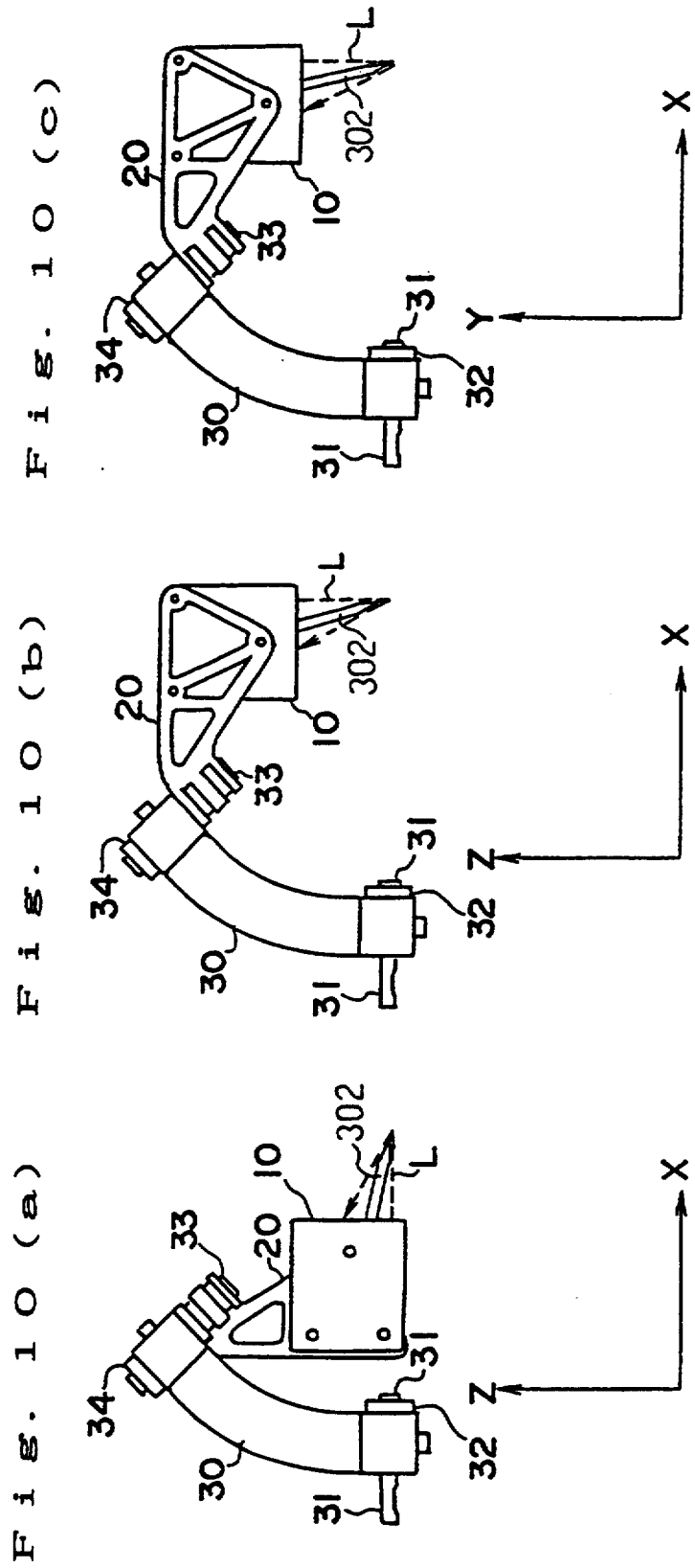
FIGS. 10(a), 10(b) and 10(c) are schematic views illustrating the relationship between pivoting positions of an intermediate arm 30 and a wing arm 20 and the laser light irradiation direction L.

Accordingly, if the horizontal arm 6 is directed in the X direction as shown in FIG. 6, then if the center line of the main shaft 31 is directed in the X-axis direction so as to be parallel (imaginary line in FIG. 13) to the center line of the horizontal arm 6, the irradiation direction L of laser light irradiated from the laser unit 10 can be made to coincide with any one of the X, Y and Z directions as shown in FIGS. 10(a) to (c) by changing the pivoting position of the intermediate arm 30 with respect to the main shaft 31 and the pivoting position of the wing arm 20 with respect to the auxiliary shaft 33.

Further, according to the present embodiment, it is also possible to direct the irradiation direction of laser light to a direction other than the directions of the three axes described above by pivoting the intermediate arm 30 in the direction of the arrow mark P (FIG. 13) with respect to the shaft 6A.

Figure 11:
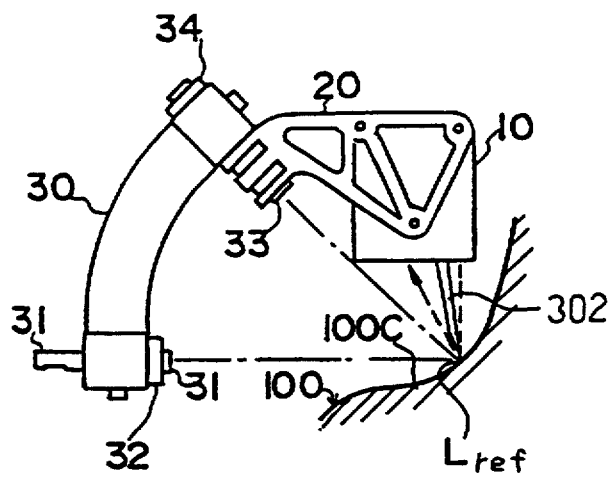
FIGS. 11(a), 11(b) and 11(c) are views illustrating a method of detecting coordinates of a recessed portion according to the present invention.
Figure 11:
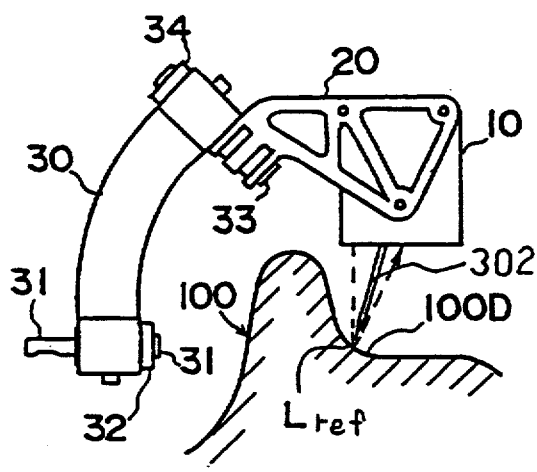
Figure 11:
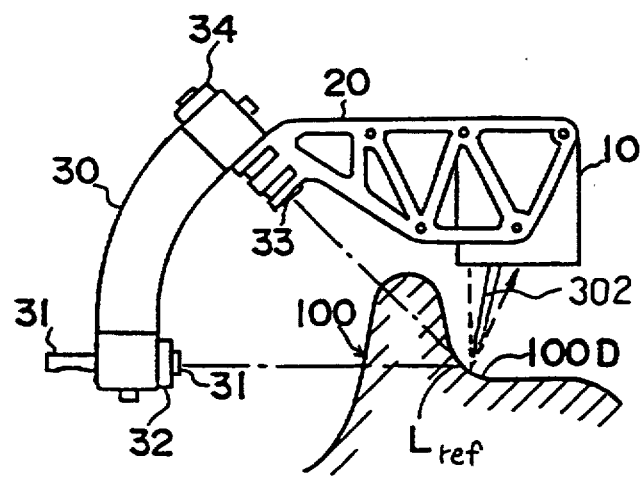
Figure 12:
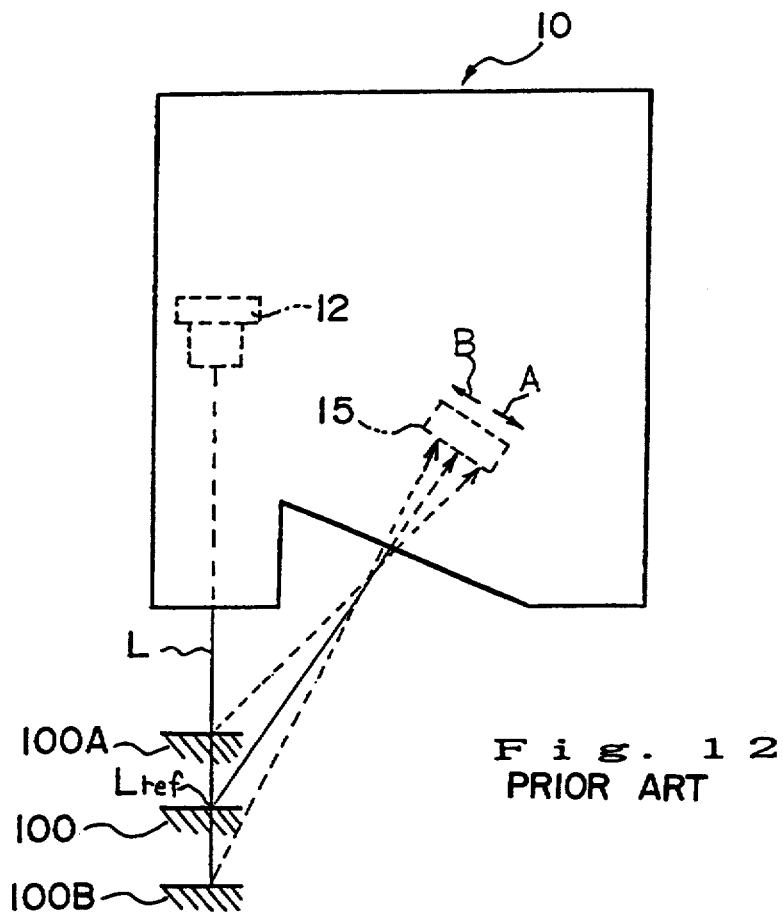
FIG. 12 is a view showing a conventional non-contacting coordinate detecting method.

The laser unit 10 is constructed such that it does not irradiate laser light from a central portion thereof but irradiates laser light from a position near a side face thereof. When a recessed portion 100C is formed on the surface of the subject 100 for measurement as shown in FIG. 11(a), it is possible to approach a delay angle of the wall face of the recessed portion 100C to effect detection of the coordinates. Further, since the mounting means of the laser unit 10 on the wing arm 20 may be by screws as described hereinabove, if the laser unit 10 is mounted on the wing arm 20 with the front side directed backwardly, then even if a recessed portion 100D is formed in the direction opposite to that of FIG. 11(a) as shown in FIG. 11(b), it is possible to approach the wall face of the recessed portion 100D to effect detection of coordinates at many positions.

It is to be noted that, when the laser unit 10 is mounted reversely, the reference point Lref is not on the crossing point between the main shaft 31 and the auxiliary shaft 33 as shown in FIG. 11(b), but if the arm 20 is formed such that it is extended in the direction of the center axis of the main shaft 31 (refer to FIG. 11(c)) when the wing arm 20 is in the condition of FIG. 11(a), then it is possible to mount the laser unit 10 such that the reference point Lref may be positioned on the crossing point between the main shaft 31 and the auxiliary shaft 33 even if the laser unit 10 is directed with the front side directed backwardly.

Referring back to FIG. 13, a cable 99 for a power source supply and data outputting led out from the laser unit 10 extends through the inside of the auxiliary shaft 33 and the inside of the horizontal arm 6, which have a hollow structure. The cable extends out from the rear end of the horizontal arm 6. Since the cable 99 is accommodated in the horizontal arm 6 in this manner, the cable 99 does not interfere with a measuring operation and protection of the cable 99 can be achieved. Further, also the quantity of guides (for example, tapes) for fixation of the cable necessary for bundling outer cables is decreased and the appearance is not deteriorated. It is to be noted that also the intermediate 30, the main shaft 31 and so forth may have a hollow structure so that the cable 99 may extend also through the insides of the hollow structures.

Figure 8:
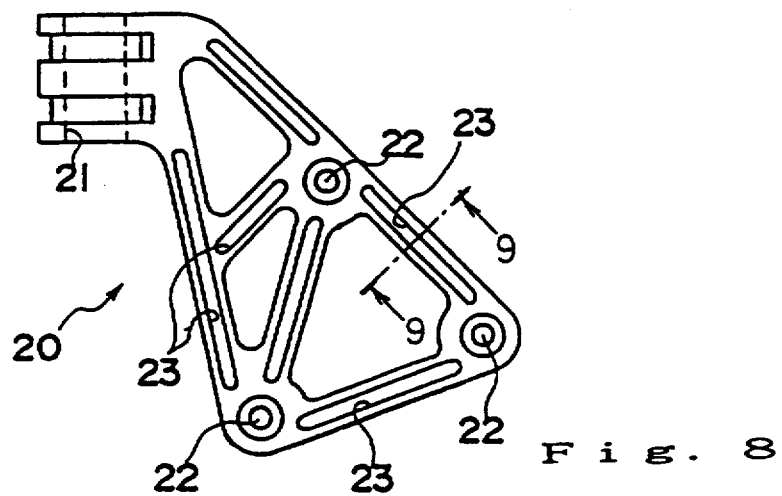
FIG. 8 is a front elevational view of a wing arm 20.
Figure 9:
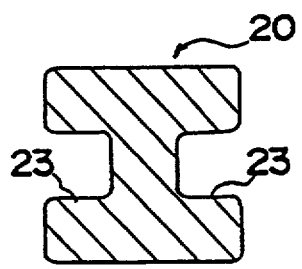
FIG. 9 is a sectional view taken along line 9—9 of FIG. 8.

The intermediate arm 30, wing arm 20 and laser unit 10 mounted at the end portion of the horizontal arm 6 (FIG. 6) must be constructed to be of light weight in order to raise the accuracy in three-dimensional measurement. To this end, the wing arm 20 on which the laser unit 10 is mounted has such a framed construction as shown in FIG. 8. A shaft hole 21 in which the auxiliary shaft 33 is to be inserted and a mounting hole 22 for mounting the laser unit 10 therein are perforated at suitable positions of the wing arm 20. Further, recessed portions 33 are perforated at the front and back portions of several linear members forming the framed construction described above in order to achieve reduction of the weight of the wing arm 20 (refer to FIG. 9).

Due to such construction, reduction in the weight and high, rigidity of the wing arm 20 can be achieved. Further, in order to achieve further reduction of the weight and enhance the accuracy of dimensions, the wing arm 20 is produced, for example, from magnesium.

Figure 3:
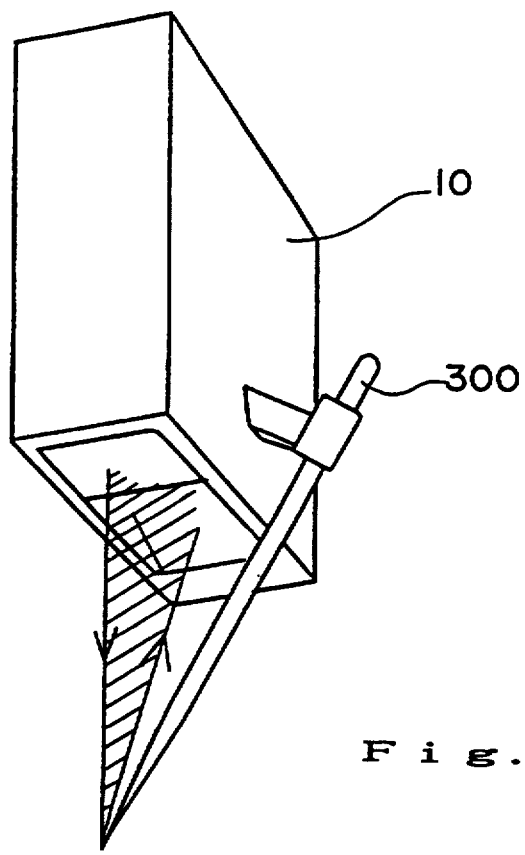
FIG. 3 is a perspective view of a laser unit constructed according to a second embodiment of the present invention.

It is to be noted that, while the needle 302 in the embodiment described above is described as being installed within the region (parallel to the optic axes LO and L1) defined between the optic axis LO of laser light radiated from the light emitting portion and the optic axis L1 of laser light received by the light receiving portion when the detection point is at the reference point Lref with respect to the laser unit 10, the present invention is not limited to this construction. The needle 302 may be installed in such a manner, for example, as shown in FIG. 3 only if it can indicate the crossing point between the optic axes LO and L1.

As is apparent from the foregoing description, according to the present invention, the following effects are achieved.

(1) Since the needle 302 is provided on the laser unit 10 and the positional relationship between the detection point and the laser unit may come to the predetermined relationship when the laser unit 10 is moved so that the end of the needle 302 may indicate the detection point, the desired detection point can be designated rapidly and accurately.

(2) If the needle 302 is secured in a readily removable condition to the laser unit 10, then the needle 302 is removed when it is contacted with a subject for measurement and will not damage the subject for measurement.

(3) If the needle 302 is screwed at a rear end portion thereof in the tapping hole of the supporting portion 301, then positioning of the end portion thereof is very easy.

(4) If the supporting portion 301 in which the needle 302 is screwed and the base plate 303 secured to the laser unit 10 are secured to each other by a magnetic force, then the securing of the needle 302 in a readily removable condition can be achieved with a simple construction.

(5) If the needle 302 is disposed so that laser light may be irradiated at the end portion thereof, then designation of the detection point can be readily performed.

(6) If the needle 302 is a transparent member, then admission of randomly reflected light into the light receiving portion is prevented.

(7) If craping is performed on the end portion of the needle 302, then since laser light is reflected at random at the end portion, it can be readily visually observed.

(8) If the needle 302 is installed within the range defined by extension lines of the optic axis of laser light radiated from the light emitting portion and the optic axis of laser light received by the light receiving portion when the detection point and the laser unit 10 are in the predetermined positional relationship, the needle 302 is not contacted with cables or the like.

Figure 15:
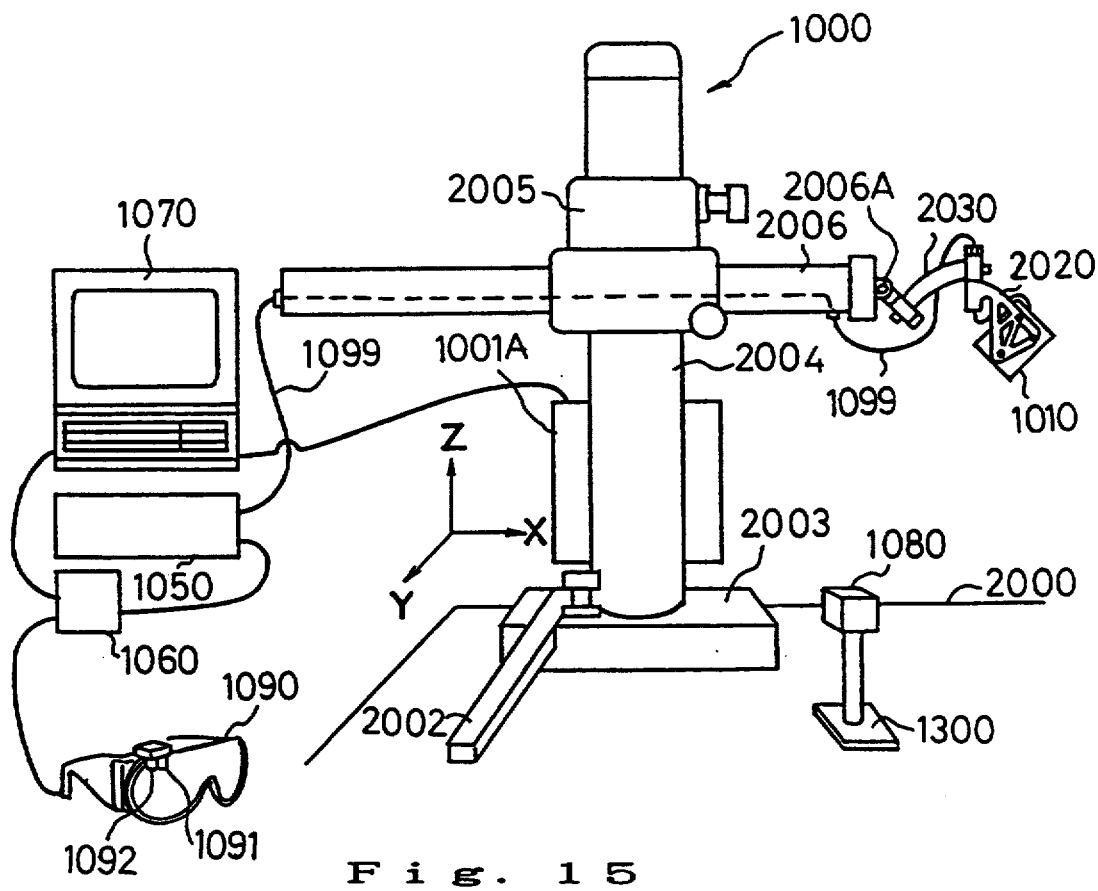
FIG. 15 is a perspective view of an embodiment according to the present invention.

FIG. 15 is a perspective view of an embodiment of the present invention. Referring to FIG. 15, a layout machine 1000 is installed on a surface plate 2000, and a guide rail 2002 thereof is secured to the surface plate 2000. A base plate 2003 of the layout machine 1000 is slidably movable in the Y direction along the guide rail 2002 and a sliding frame 2005 is slidably movable in the Z direction along a vertical arm 2004 supported vertically on the base plate 2003. Further, a horizontal arm 2006 is slidably movable in the X direction along the sliding frame 2005. A laser unit 1001 is mounted at an end of the horizontal arm 2006 by way of an intermediate arm (first intermediate arm) 2030 and a wing arm (second intermediate arm) 2020. The wing arm 2020 and the laser unit 2020 may be secured together by screws.

Accordingly, the laser unit 1010 is movable to a suitable location within a three-dimensional spacing above the surface plate 2000 by sliding movements of the base plate 2003, the sliding frame 2005 and the horizontal arm 2006 in the respective directions described above. The movement of the laser unit 1010, that is, the sliding movements of the base plate 2003, the sliding frame 2005 and the horizontal arm 2006 in the respective directions described above, can be performed by a suitable known technique by means of a motor or by a manual operation or the like.

Figure 16:
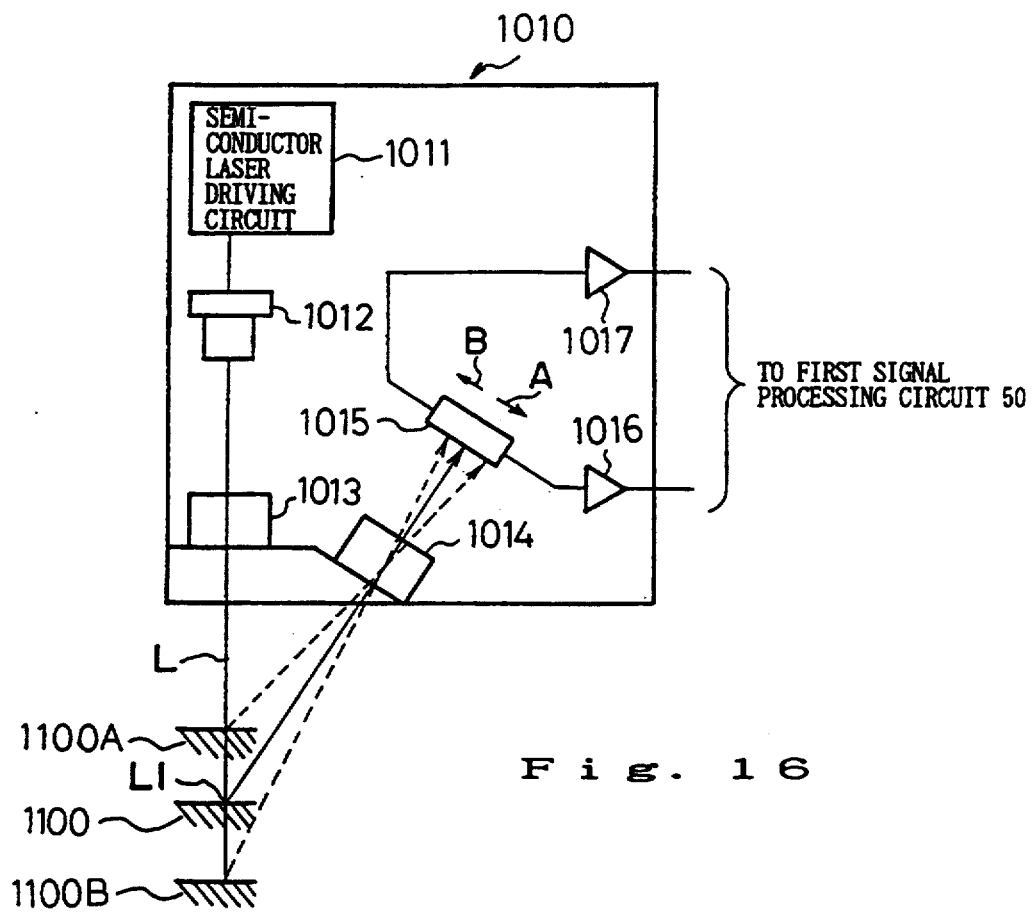
FIG. 16 is a schematic view showing the structure of the laser unit.

The structure of the laser unit 1011 is shown in FIG. 16. A semiconductor laser 1012 is driven by a semiconductor laser driving circuit 1011 to radiate laser light. The laser light is irradiated upon the subject 1100 for measurement by way of a light projecting lens 1013. When the subject 1100 for measurement is disposed at a reference point L1, for example, at the distance of 50 mm in the laser light irradiation direction from the laser light irradiation position of the laser unit 1010, laser light reflected at random from the subject 1100 for measurement is received at a central position of a light position detecting element 1015 by way of a light receiving lens 1014. Further, when the subject 1100 for measurement is nearer or farther than the reference point as indicated by reference characters 1100A and 1100B, the light receiving position of laser light on the light position detecting element 1015 moves in the direction of the arrows A or B. The output of the light position detecting element 1015 is outputted to a first signal processing circuit 1050, FIG. 15, by way of amplifiers 1016 and 1017.

Referring back to FIG. 15, a cable 1099 connected to the amplifiers 1016 and 1017 as well as the semiconductor laser driving circuit 1011 of the laser unit 1010 is connected to the first signal processing circuit 1050 described above. The first signal processing circuit 1050 serves as a power source for the semiconductor laser driving circuit 1011 and has the function of outputting, depending upon a difference of the light receiving position of laser light on the light position detecting element 1015, an analog signal corresponding to the distance between the laser unit 1010 and the subject 1100 for measurement. When the distance between the laser unit 1010 and the subject 1100 becomes smaller or larger than a preset distance, a digital signal is outputted representing the distance. A laser displacement gage LC2320 and a controller LC-2100 manufactured by Keyence Kabushiki Kaisha can be used, for example, for the laser unit 1010 and the first signal processing circuit 1050.

The first signal processing circuit 1050 is connected to a personal computer 1070 by way of a second signal processing circuit 1060. The second signal processing circuit 1060 includes a time constant circuit for applying output delaying processing for prevention of chattering to an output signal, for example, a signal of a distance between the laser unit 1010 and the subject for measurement, of the first signal processing circuit 1050 an inverter circuit and so forth. It is to be noted that the second signal processing circuit 1060 can be omitted in accordance with a responding condition, a polarity or the like of the output signal of the first signal processing circuit 1050.

The layout machine 1000 includes a coordinate detecting apparatus 1001A for detecting coordinates of the horizontal arm 2006, in other words, coordinates of the reference point L1, and the output signal thereof is outputted to the personal computer 1070. The personal computer 1070 automatically collects coordinates of the reference point L1 which are an output signal of the coordinate detecting apparatus 1001A at a point in time when the subject 1100 for measurement reaches the reference point L1 using the output signal of the second signal processing circuit 1060, or the first signal processing circuit 1050, and reproduces as in accordance with the necessity, the shape of a profile of the subject for measurement on a CRT using the fetched coordinate information. The automatic collection of coordinates will be hereinafter described.

Laser light protective goggles 1090 are provided to protect the eyes of a measuring person from laser light irradiated from the laser unit 1010, and blue and red LEDs 1091 and 1092 are mounted at an upper portion of the laser light protective goggles 1090 so that they may be included in the field of view of the measuring person. An enlarged view of the laser light protective goggles 1090 is shown in FIG. 29. The blue LED 1091 and the red LED 1092 are connected to the second signal processing circuit 1060, or the first signal processing circuit 1050. Also the manner of use of the blue LED 1091 and the red LED 1092 will be hereinafter described.

A subject for measurement (not shown) is placed on the surface plate 2000, and also a reference cube 1080 is placed on the surface plate 1300 which is mounted to the surface plate 2000. Also the construction and the manner of use of the reference cube 1080 will be hereinafter described.

Figure 17:
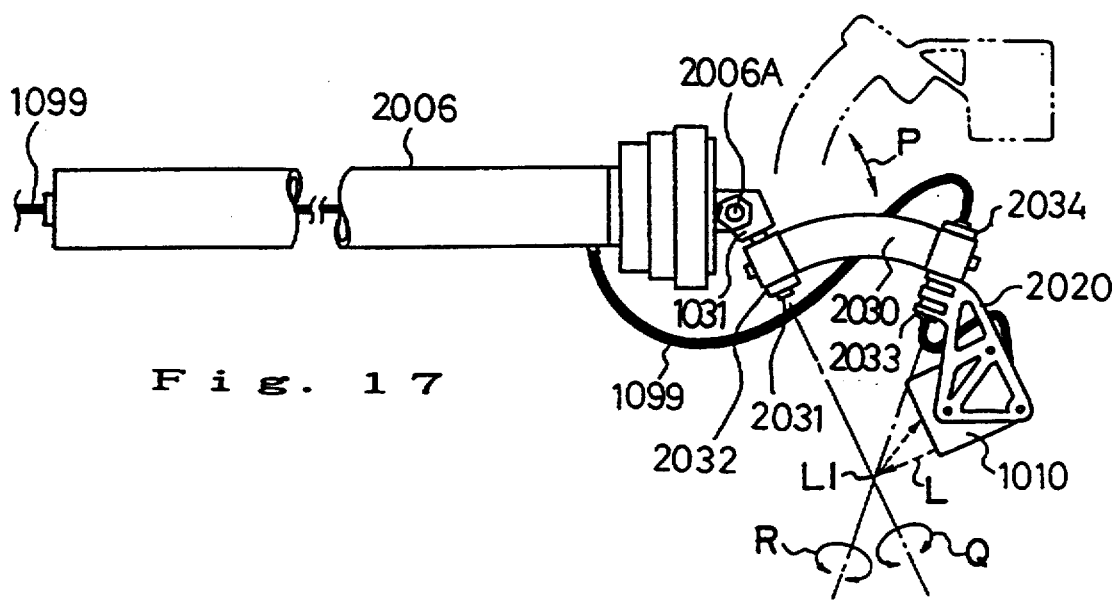
FIG. 17 is a front elevational view of a horizontal arm, an intermediate arm, a wing arm and a laser unit mounted on the horizontal arm.

FIG. 17 is a front elevational view of the horizontal arm 2006 and the intermediate arm 2030, wing arm 2020 and laser unit 1000 mounted on the horizontal arm 2006, all shown in FIG. 15. In FIG. 17 like reference numerals to those of FIG. 15 denote like or equivalent portions. First, a pair of bearings 2032 and 2034 are securely mounted at the opposite ends of the intermediate arm 2030, and a main shaft 2031 and an auxiliary shaft 2033 are inserted for rotation in the bearings 2032 and 2034. The main shaft 2031 is secured to a shaft 2006A mounted for rotation at an end of the horizontal arm 2006 while the auxiliary shaft 2033 is secured to the wing arm 2020. Accordingly, an end portion farther than the main shaft 2031 and the intermediate shaft 2030 can be pivoted in the direction indicated by an arrow P around the shaft 2006A. An end portion farther than the intermediate arm 2030 can be pivoted in the direction indicated by an arrow Q around the main shaft 2031. An end portion farther than the wing arm 2020 can be pivoted in the direction indicated by an arrow R around the auxiliary shaft 2034. The pivotal portions are fixed using a suitable known technique upon measurement of coordinates by the present non-contacting three-dimensional measuring instrument.

Figure 14:
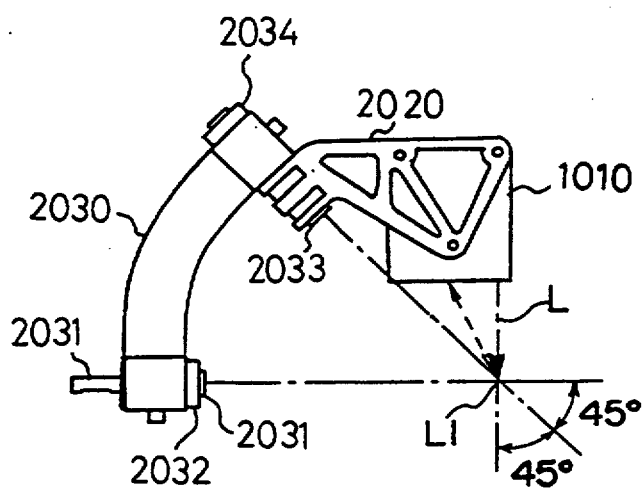
FIG. 14 is a front elevational view of essential portions of an embodiment of the present invention.

Now, as shown in FIG. 14, the main shaft 2031 and the auxiliary shaft 2033 provided on the intermediate arm 2030 are mounted such that the angle defined by extension lines of the center axes thereof may be 45 degrees. Meanwhile, the laser unit 1010 is mounted on the wing arm 2020 such that laser light irradiated in the direction of an arrow mark L from the laser unit 1010 may make an angle of 45 degrees with respect to the center axis of the auxiliary shaft 2033.

If the horizontal arm 2006 is directed in the X direction as shown in FIG. 15, then if the center line of the main shaft 2031 is directed in the X axis direction so as to be parallel (imaginary line in FIG. 17) to the center line of the horizontal arm 2006, the irradiation direction L of laser light irradiated from the laser unit 1010 can be made to coincide with any one of the X, Y and Z directions as shown in FIGS. 11(a) to 11(c) by changing the pivoting position of the intermediate arm 2030 with respect to the main shaft 2031 and the pivoting position of the wing arm 2020 with respect to the auxiliary shaft 2033.

Figure 18:
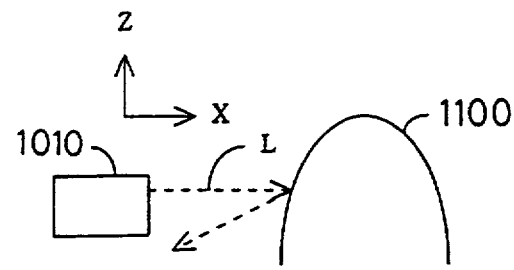
FIGS. 18(a), 18(b) and 18(c) are views illustrating a technique for adjusting the distance between the laser unit and a subject for measurement according to an embodiment of the present invention.
Figure 18:
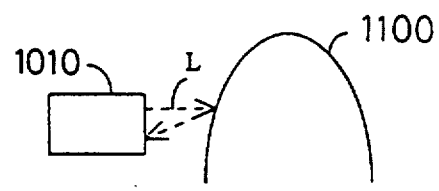
Figure 18:
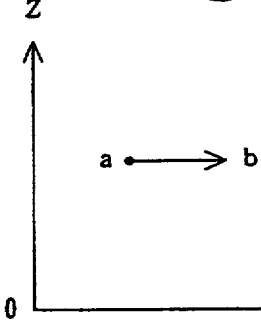
Figure 19:
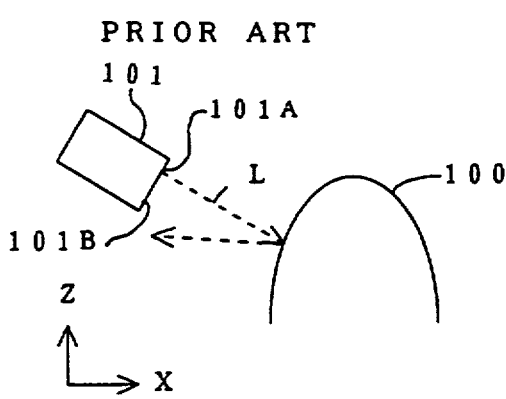
FIGS. 19(a) and 19(b) are views for illustrating a conventional technique of detection of coordinates and illustrating the positional relationships between a laser unit and a subject for measurement.
FIG. 19(c) is a graph showing variation of coordinates when a laser unit is moved from the condition of FIG. 19(a) to the condition of FIG. 19(b)
Figure 19:
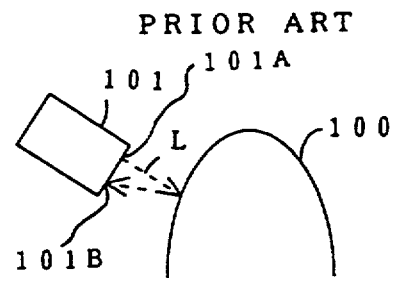
Figure 19:
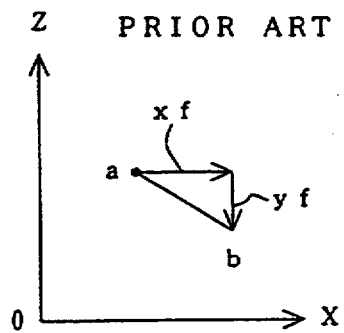

In the embodiment of the present invention, when laser light is irradiated in the X direction as shown in FIGS. 18(a) and 18(b), the distance to the subject 1100 for measurement can be adjusted by feeding the laser unit 1010 only in the same direction without varying the irradiation position of the laser light. Accordingly, detection of coordinates of an outer profile of the subject 1100 for measurement by the non-contacting three-dimensional measuring instrument can be performed readily. While, naturally with such a coordinate detecting method, laser light cannot be irradiated perpendicularly upon a position of the subject 1100 for measurement for which coordinates are to be detected, since the coordinate detecting method is of the non-contacting type employing laser light, no deterioration of the accuracy in detection of the coordinate position occurs.

Further, it is also possible to direct the irradiation direction of laser light to a direction other than the directions of the three axes described above by pivoting the intermediate arm 2030 in the direction of the arrow mark P (FIG. 17) with respect to the shaft 2006A.

Further, since the laser unit 1010 is constructed such that it does not irradiate laser light from a central portion thereof but irradiates laser light from a position near a side face thereof, also when a recessed portion 100C is formed on the surface of the subject 100 for measurement as shown in FIG. 11(a), it is possible to approach a delay angle of the wall face of the recessed portion 100C to effect detection of coordinates. Further, since the mounting means of the laser unit 1010 on the wing arm 2020 is screws as described hereinabove, if the laser unit 1010 is mounted on the wing arm 2020 with the front side directed backwardly, then even if a recessed portion 100D is formed in the direction opposite to that of FIG. 11(a) as shown in FIG. 11(b), it is possible to approach the wall face of the recessed portion 100D to effect detection of coordinates at many positions.

It is to be noted that, when the laser unit 1010 is mounted reversely, the reference point L1 is not on the crossing point between the main shaft 2031 and the auxiliary shaft 2033 as shown in FIG. 11(b), but if the arm 2020 is formed such that it extends in the direction of the center axis of the main shaft 2031 (refer to FIG. 11(c)) when the wing arm 2020 is in the condition of FIG. 11(a), then it is possible to mount the laser unit 1010 such that the reference point L1 may be positioned on the crossing point between the main shaft 2031 and the auxiliary shaft 2033 even if the laser unit 1010 is directed with the front side directed backwardly.

In this manner, in the present embodiment, measurement of the inside of a recessed portion can be performed readily and with a high degree of accuracy. In other words, interference is small and the measurement limit is high.

Further, in the present embodiment, since the laser unit 1010 is mounted on the wing arm 2020 such that the reference point L1 is positioned at the crossing point between the center axes of the main shaft 2031 and the auxiliary shaft 2033 as shown in FIGS. 14 and 17, even if, for example, the wing arm 2020 and/or the intermediate arm 2030 are pivoted to vary the irradiation direction of laser light as shown in the several views of FIGS. 10(a) to 10(c), the position of the reference point L1 does not vary.

Accordingly, even if any of the arms 2020 and 2030 is pivoted, there is no need of adjusting the origin of the layout machine 1000 every time.

Referring back to FIG. 17, a cable 1099 for power source supply and data outputting led out from the laser unit 1010 extends through the inside of the auxiliary shaft 2033 and the inside of the horizontal arm 2006, which have a hollow structure, and extends out from the rear end of the horizontal arm 2006. Since the cable 1099 is accommodated in the horizontal arm 2006 in this manner, the cable 1099 does not interfere with a measuring operation and protection of the cable 1099 can be achieved. Further, also the quantity of guides (for example, tapes) for fixation of the cable necessary for bundling outer cables is decreased and the appearance is not deteriorated. It is to be noted that also the intermediate 2030, the main shaft 2031 and so forth may have a hollow structure so that the cable 1099 may extend also through the insides of the shafts.

The intermediate arm 2030, wing arm 2020 and laser unit 1010 mounted at the end portion of the horizontal arm 2006 (FIG. 15) must be constructed to be light in weight in order to increase the accuracy in three-dimensional measurement. To this end, the wing arm 2020 on which the laser unit 1010 is mounted has a frame construction as shown in FIG. 8, as previously described.

The intermediate arm 2030 on which the wing arm 2020 is mounted is produced by winding carbon fibers on an outer periphery of an epoxy honeycomb which is to make a core member and securely mounting the bearings 2032 and 2034 onto the opposite ends of the epoxy honeycomb using a jig. In the following, the structure and the manufacturing process of the intermediate arm 2030 will be described with reference to FIGS. 20(a), 20(b), 21(a), 21(b), 22, 23, 24, 25 and 26. It is to be noted that hatching lines are omitted in FIGS. 20(b), 21(b) and 22.

First, as shown in FIGS. 20(a) and 20(b), a pair of epoxy honeycombs 3035 which are to make a core member of the intermediate arm 3030 and construct part of an annular shape are adhered in an opposing relationship to each other. Then, carbon fibers 3037 are adhered to the surface of the epoxy honeycomb 3035 as shown in FIGS. 21(a) and 21(b), and carbon fibers 3037 are adhered also to the surface of the epoxy honeycomb 3036. The adhesion is performed, for example, by disposing the carbon fibers 2037 in advance in a female die having a profile shape similar to that of the epoxy honeycomb 2035 or 2036 and inserting the epoxy honeycomb 2035 or 2036 into the female die. It is to be noted that the adhesion of the carbon fibers 2037 may be performed before the epoxy honeycombs 2035 and 2036 are adhered to each other. Thereafter, carbon fibers 3038 are wound once more on and adhered to the carbon fibers 3037.

It is to be noted that, since the carbon fibers are longer than the epoxy honeycombs 3035 and 3036, recessed portions 3039 for mounting the bearings 3032 and 3034, which will be hereinafter described, are formed at the opposite ends of the epoxy honeycombs 3035 and 3036 as a result of adhesion of the carbon fibers.

Figure 23:
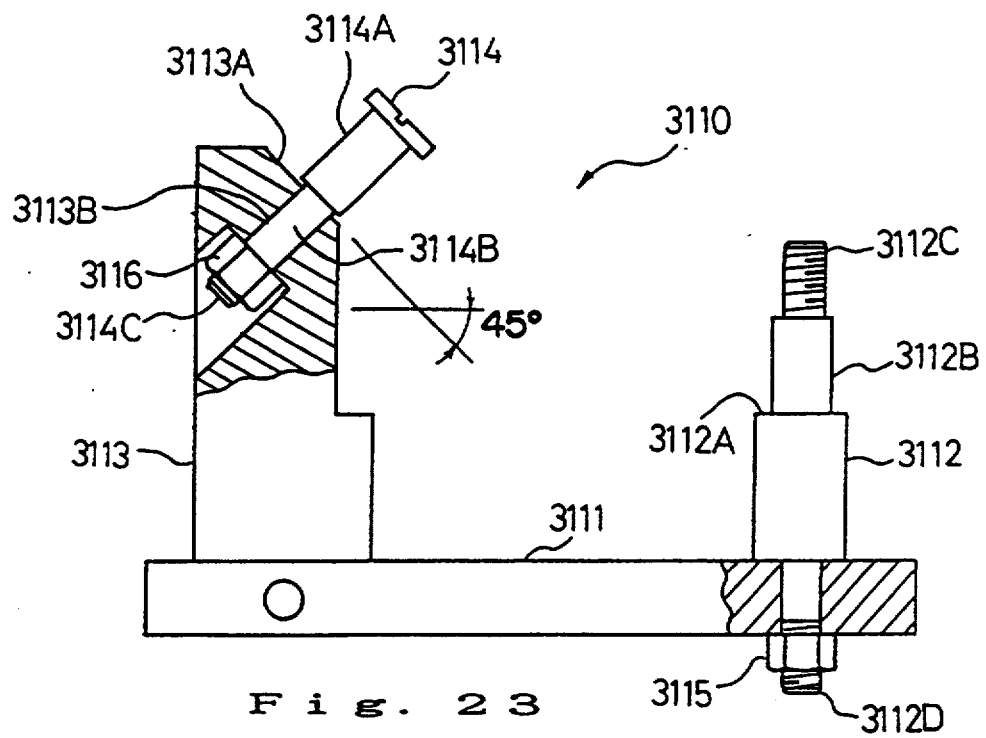
FIG. 23 is a front elevational view of a jig apparatus according to the present invention.

After the adhesion of the carbon fibers is completed in this manner, the bearings (slide bearing) 3032 and 3034 made of, for example, aluminum are mounted using such a jig apparatus 3110 as shown in FIG. 23. Referring to FIG. 23, first, a column portion 3112B is formed on a first mounting jig 3112 such that a mounting face 3112A perpendicular to the center axis of the first mounting jig 3112 may be formed, and a male screw 3112C is formed at an end of the column portion 3112B. Further, another male screw 3112D is formed on the opposite side to the male screw 3112C, and the first mounting jig 3112 is mounted on a jig plate 3111 by screwing a nut 3115 on the male screw 3112D.

A second mounting jig 3113 is mounted on the jig plate 3111 such that a mounting face 3113A thereof makes an angle of 45 degrees with respect to the mounting face 3112A. Further, a hole portion 3113B is perforated perpendicularly to the mounting face 3113A in the mounting face 3113A.

A third mounting jig 3114 is constituted from a column portion 3114A, a leg portion 3114B having a smaller diameter than the column portion 3114A and a male screw 3114C formed at an end of the leg portion 3114B. In FIG. 23, the third mounting jig 3114 is mounted on the second mounting jig 3113 by inserting the leg portion 3114B in the hole portion 3113B and screwing the male screw 3114C in the nut 3116, but before positioning of the intermediate arm 3030, the third mounting jig 3114 is in a removed condition.

Figure 24:
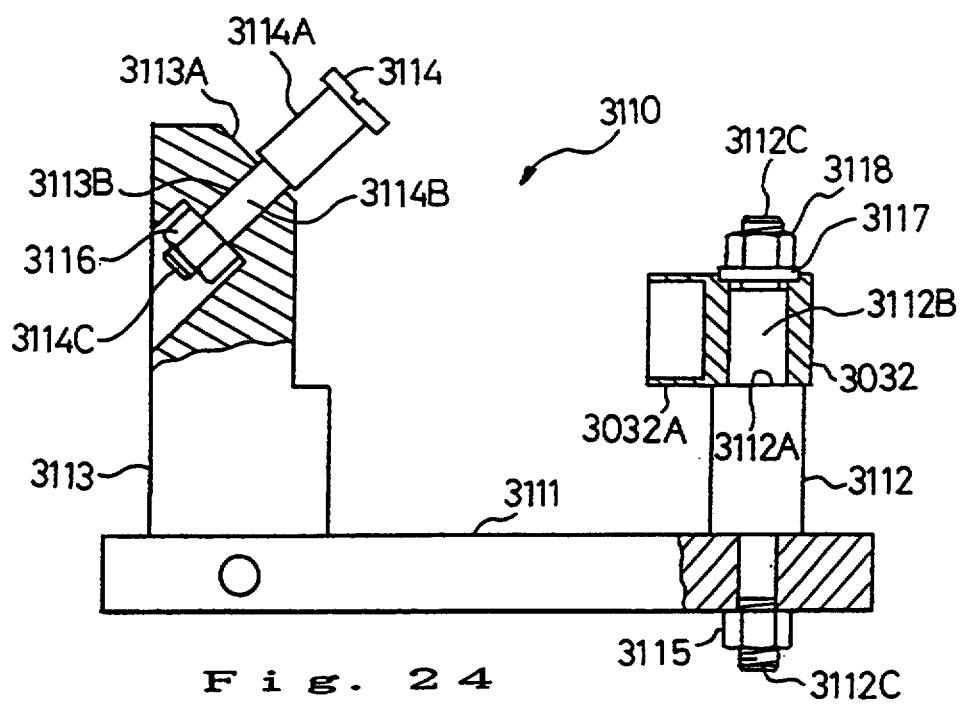
FIG. 24 is a view illustrating the positioning of the bearing mounted on the jig apparatus.

In order to produce the intermediate arm 3030 using such a jig apparatus 3110, first, the bearing 3032 is fitted onto the column portion 3112B of the jig apparatus 3110 as shown in FIG. 24, and after the insertion, the nut 3118 is screwed onto the male screw 3112C with a washer 3117 interposed therebetween to secure the bearing 3032 in a condition wherein the bearing 3032 is closely contacted with the mounting face 3112A.

Figure 25:
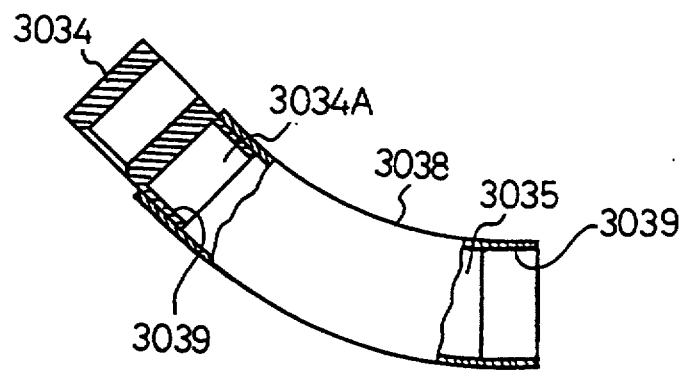
FIG. 25 illustrates a bearing for mounting at an end of the pair of epoxy honeycombs to which the carbon fibers are adhered thereto.
Figure 26:
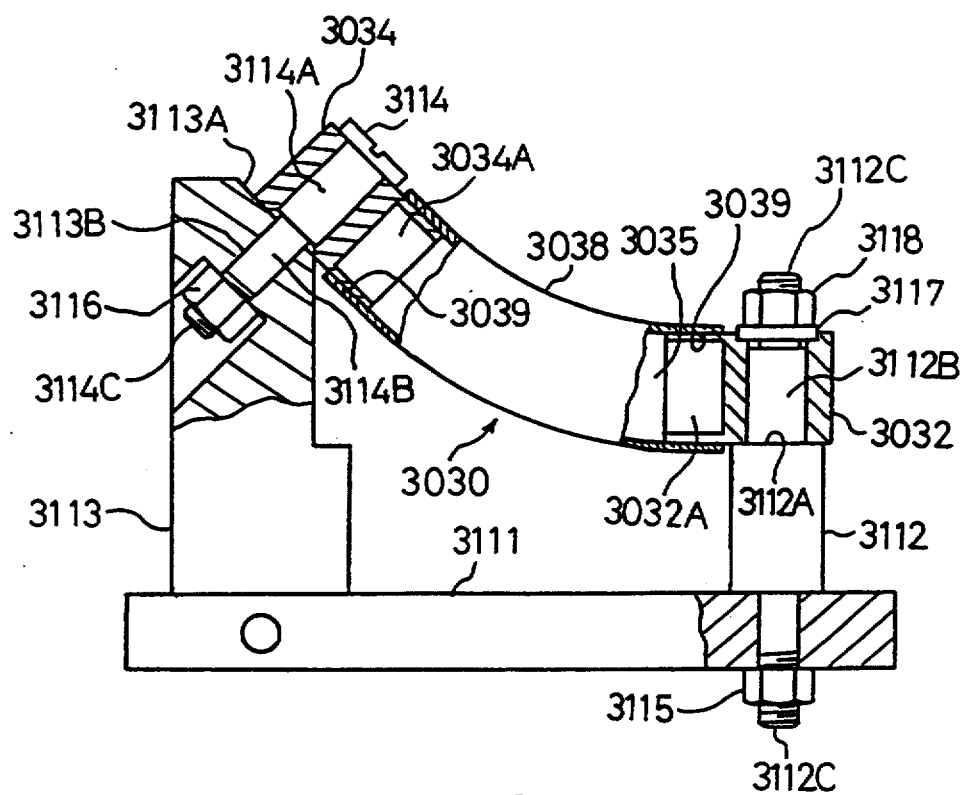
FIG. 26 illustrates a bearing and a pair of epoxy honeycombs to which the carbon fibers are adhered wherein the bearing is mounted on the jig apparatus.

Subsequently, a protruded portion 3034A of the bearing 3034 is inserted as shown in FIG. 25 into one of the recessed portions 3039 of the epoxy honeycombs 3035 and 3036 around which carbon fibers are wound as described hereinabove with reference to FIGS. 20(a), 20(b), 21(a), 21(b) and 22, and in this condition, the bearing 3034 is secured to the mounting face 3113A so that a protruded portion 3032A of the bearing 3032 secured to the first mounting jig 3112 may be inserted into the other recessed portion 3039 as shown in FIG. 26. The securing is performed by inserting the column portion 3114A of the third mounting jig 3114 into the bearing 3034 as shown in FIG. 26. Thereafter, the leg portion 3114B is inserted into the hole portion 3113B and then screwing the nut 3116 onto the male screw 3114C. Consequently, the bearing 3034 is closely contacted with the mounting face 3113A.

The shaft holes formed in the bearings 3032 and 3034 are formed perpendicularly to end faces which abut with the mounting faces 3112A and 3113A. Accordingly, as the bearings 3032 and 3034 are closely contacted with the mounting faces 3112A and 3113A which are disposed at an angle of 45 degrees relative to each other. Also the shaft holes formed in the bearings 3032 and 3034 finally make an angle of 45 degrees relative to each other. It is to be noted that, when the protruded portions 3032A and 3034A of the bearings 3032 and 3034 are inserted into the recessed portion 3039, a bonding agent is interposed between them.

After the condition shown in FIG. 26 is set, the carbon fibers are wound on outer peripheries of the bearings 3032 and 3034 using a bonding agent so that they may be fixed relative to each other. By the winding, the bearings 3032 and 3034 are fixed to the epoxy honeycombs 3035 and 3036 as well as the carbon fibers 3037 and 3038, and consequently, the intermediate arm 3030 is completed. After the intermediate arm 3030 is completed, the nuts 3116 and 3118 are removed and the intermediate arm 30 is removed from the jig apparatus 3110.

Figure 27:
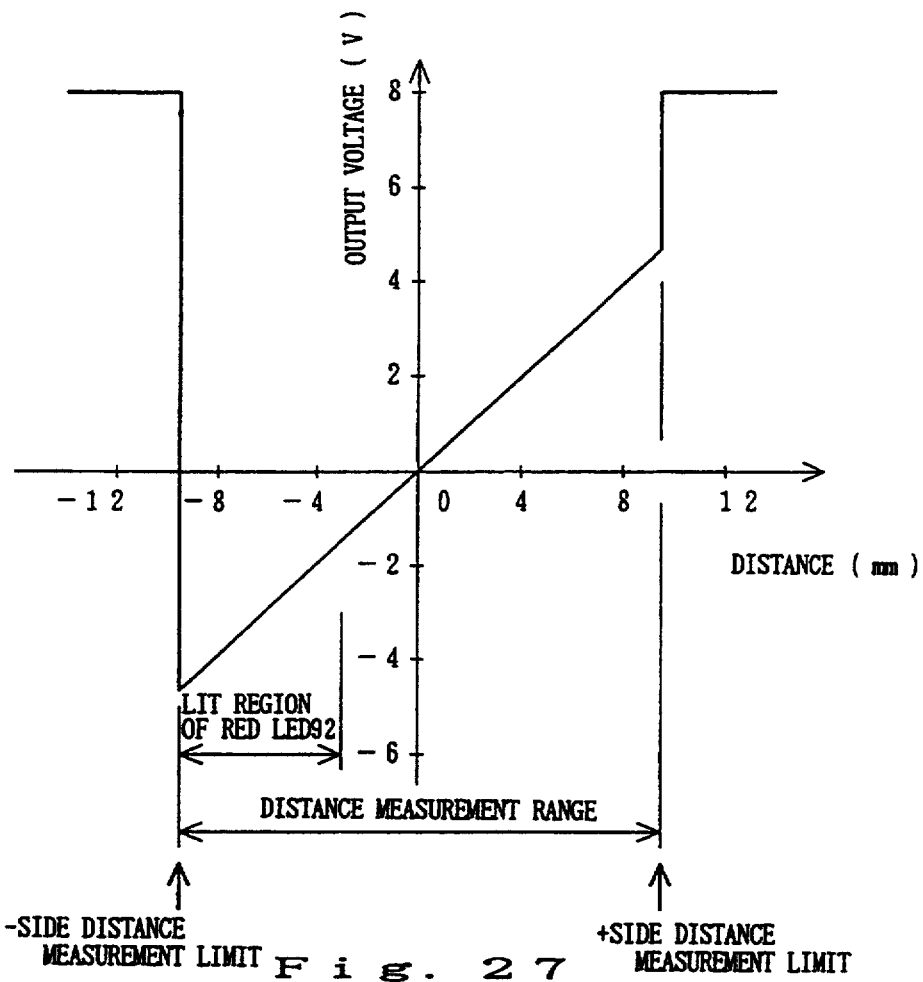
FIG. 27 is a graph showing an example of an analog signal outputted from a first signal processing circuit.

When a laser displacement gage (LC-2320) and a controller (LC-2100) manufactured by Keyence Kabushiki Kaisha are employed as the laser unit 1010 and the first signal processing circuit 1050 (FIG. 15) as described hereinabove, making use of a function of the first signal processing circuit 1050, coordinates of the reference point L1 which are outputted from the coordinate detecting apparatus 1A (FIG. 15) at a point in time when the subject for measurement reaches the reference point L1 can be collected automatically. In the following, a technique of automatic collecting of coordinates by the present non-contacting three-dimensional measuring instrument will be described. First, the first signal processing circuit 1050 outputs such an analog signal as shown, for example, in FIG. 27. Referring to FIG. 27, the distance 0 indicates that the subject for measurement has reached the reference point L1, and in the case of the laser unit 1010 of the model number described above, the distance 0 corresponds to a position of 50 mm from the laser unit 1010. Further, the plus/minus of the distance indicates that the subject for measurement is positioned farther or nearer than the reference point L1. As apparent from FIG. 27, the distance measurement range by the laser unit 1010 is the reference point $+/-$ about 9 mm, and the analog signal of it is 0 [V] at the reference point and a negative voltage and a positive voltage on the minus and plus sides with respect to the reference point.

The red LED 92 mounted on the laser light protective goggles 1090 (FIG. 29) is connected to the first signal processing circuit 1050 by way of the second signal processing circuit 1060 so that it may be lit when a minus analog signal is outputted. From a common characteristic of LEDS, the red LED 1092 will be lit within the range of the subject for measurement from the position of about $-3$ mm from the reference point to the minus size distance measurement limit position (the position of about $-9$ mm).

Figure 28:
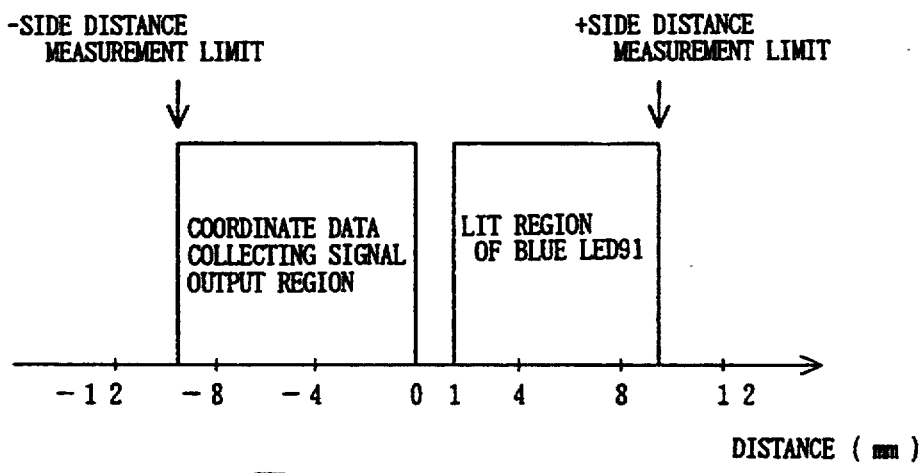
FIG. 28 is a graph showing an example of a digital signal outputted from the first signal processing circuit.

The first signal processing circuit 1050 has a function of outputting, further when the distance between the laser unit 10 and the subject for measurement has become smaller or greater than a preset distance as described hereinabove, a digital signal (on/off signal) representing the fact is generated. In the present example, as shown in FIG. 28, the first signal processing circuit 1050 outputs a signal to turn the blue LED 1091 on when the subject for measurement is positioned within the range from the position of 1 mm from the reference point to the plus side distance measurement limit position (the position of about 9 mm), but outputs another signal (hereinafter referred to coordinate data collecting signal) to collect coordinate data of the coordinate detecting apparatus 1A (FIG. 15) when the subject for measurement has entered the range from the reference point to the minus side distance measurement limit position.

Accordingly, if the laser unit 1010 approaches the subject 1100 for measurement until the subject 1100 for measurement enters the inner side (minus direction) with respect to the plus side distance measurement limit position, the blue LED 1091 is illuminated first (refer to FIG. 30(a)). When the laser unit 1010 further approaches until the subject 1100 for measurement enters the inner side with respect to the position of 1 mm from the reference position L1, the blue LED 1091 is extinguished (FIG. 30(b)), and then when the subject 1100 for measurement further enters the further inner side with respect to the reference point L1, a coordinate data collecting signal is outputted and coordinate data when the subject for measurement 1100 reached the reference point is fetched.

When the laser unit 1010 further approaches so that the subject 1100 for measurement enters the further inner side with respect to the position of about −3 mm from the reference point L1, the red LED 1092 is lit (FIG. 30(c)). When the laser unit 1010 enters the further inner side with respect to the minus side distance measurement limit position, the reference point L1 moves out of the coordinate data collecting region as apparently seen from FIG. 28, and the coordinate data collecting signal disappears. Accordingly, when the laser unit 1010 thereafter moves again in the plus direction farther than the minus side distance measurement limit position, a coordinate data collecting signal is generated again and coordinate data at the minus side distance measurement limit position are collected. As a result, a signal having an error of about 9 mm is inputted, and accordingly, in order to prevent such a situation, the red LED 1092 is illuminated at a point in time when the subject 1100 for measurement approaches nearer than the reference point L1 so as to give a warning to an operator of the, non-contacting three-dimensional measuring instrument. In particular, when the red LED 1092 is lit, if the layout machine 1000 (FIG. 15) is operated immediately so that the laser unit 1010 may be moved away, then double detection of coordinate data can be prevented.

It is to be noted that, if the first signal processing circuit 1050 has a function that, even if the distance between the laser unit 1010 and the subject 1100 for measurement becomes smaller or greater than the preset difference, a digital signal indicating this is not outputted immediately but a signal is outputted when the distance described above still continues even after lapse of about 1 second, then if the function is applied to the case wherein the subject 1100 for measurement enters in the minus direction farther than the minus side distance measurement limit position, then even if the laser unit 1010 approaches the subject 100 for measurement excessively until the red LED 1092 is extinguished momentarily, double detection of coordinate data can be prevented by moving the laser unit 1010 away from the subject 1100 for measurement before lapse of about 1 second.

Figure 31:
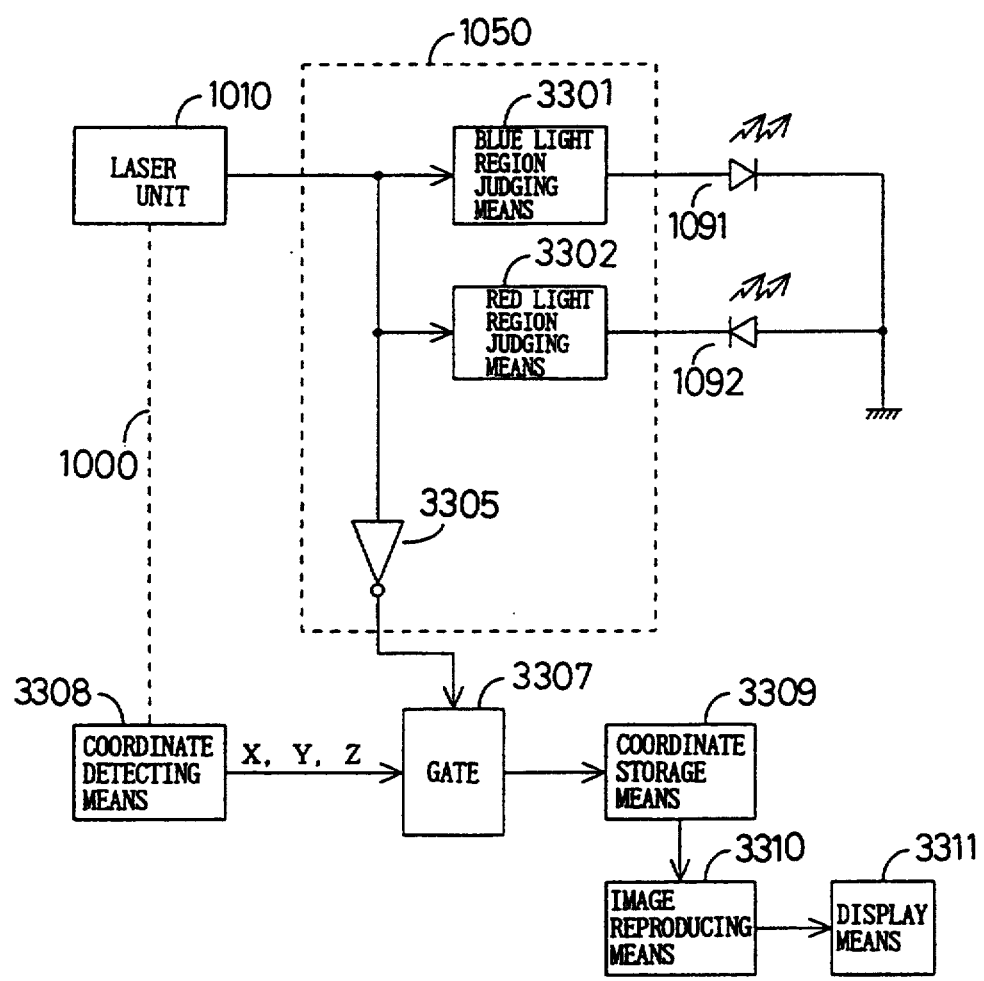
FIG. 31 is a functional block diagram of an embodiment of the present invention.

FIG. 31 is a functional block diagram of an embodiment of the present invention. Referring to FIG. 31, like reference characters to those of FIG. 15 denote like or equivalent portions. A distance signal which is output data of the laser unit 1010 is inputted to the blue light region judging means 3301 and red light region judging means 3302. The blue lit region judging means 3301 judges whether or not the position of the subject for measurement is positioned within the range from the position of 1 mm from the reference point to the plus side distance measurement limit position, and in the case of an affirmative judgment. The blue LED 1091 is energized and illuminated. Meanwhile, the red light region judging means 3302 judges whether or not the subject for measurement is positioned within the range from the position of about −3 mm from the reference point to the minus side distance measurement limit position, and in the case of an affirmative judgment, the red LED 1092 is energized and illuminated.

An inverter 3305 generates an output when the subject for measurement approaches nearer than the reference point. A gate 3307 is triggered by an output of the inverter 3305, whereupon it outputs coordinate data (X, Y and Z coordinate data) outputted from the coordinate detecting means 3308 (coordinate detecting apparatus 1A) to coordinate storage means 3309. Image reproducing means 3310 reproduces, using coordinate data stored in the coordinate storage means 3309, a profile of the same using a suitable known technique. As a result, an output to display means 3311, on which it is displayed is generated. The gate 3307, coordinate storage means 3309, image reproducing means 3310 and display means 3311 are functions of the personal computer 1070 (FIG. 15).

Figure 32:
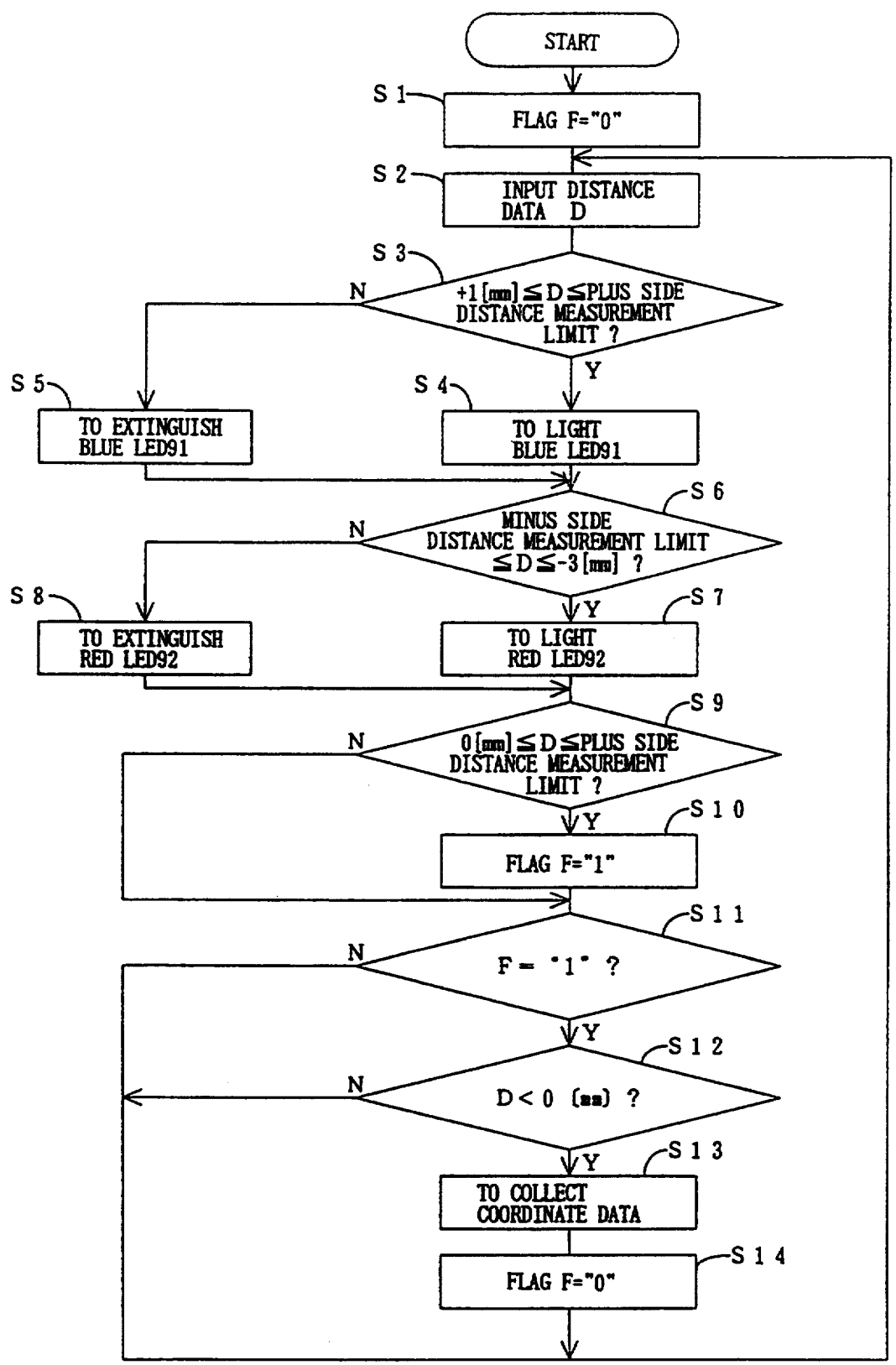
FIG. 32 is a flow chart illustrating processing for prevention of double detection of coordinate data.

With the construction described above, while the laser unit 1010 must be moved away from the subject for measurement immediately when the red LED 1092 is illuminated, double detection of coordinate data can be prevented by executing such processing as illustrated in FIG. 32. The processing is executed, for example, by the personal computer 1070.

Referring to FIG. 32, first at step S1, a flag F is reset to "0". At step S2, distance data D which is output data (data of the distance to the subject for measurement) of the laser unit 1010 is inputted. At step S3, it is judged whether or not D is, within the range from the distance of 1 mm from the reference point to the plus side distance measurement limit. In the case of an affirmative judgment, the blue LED 1091 is illuminated at step S4, but in the case of a negative judgment, the blue LED 1091 is extinguished at step S5.

At step S6, it is judged whether or not D is within the range from the distance of −3 mm from the reference point to the minus side distance measurement limit. In the case of the affirmative judgment, the red LED 1092 is illuminated at step S7, but in the case of the negative judgment, the red LED 92 is extinguished at step S8.

At step S9, it is judged whether or not D has a positive value, that is, whether or not D is within the range from 0 mm to the plus side distance measurement limit. In the case of an affirmative judgment, the flag F is set to "1" at step S10.

At step S11, it is judged whether or not the flag F is "1", and if the flag F is "1", it is judged at step S12 whether or not D has become minus. If D is minus data, then coordinate data of the reference point L1 are fetched at step S13, and then at step S14, the flag F is reset to "0". Thereafter, the processing returns to step S2. If a negative judgment is made at step S11 or S22 described above, then the processing returns to step S2.

Figure 33:
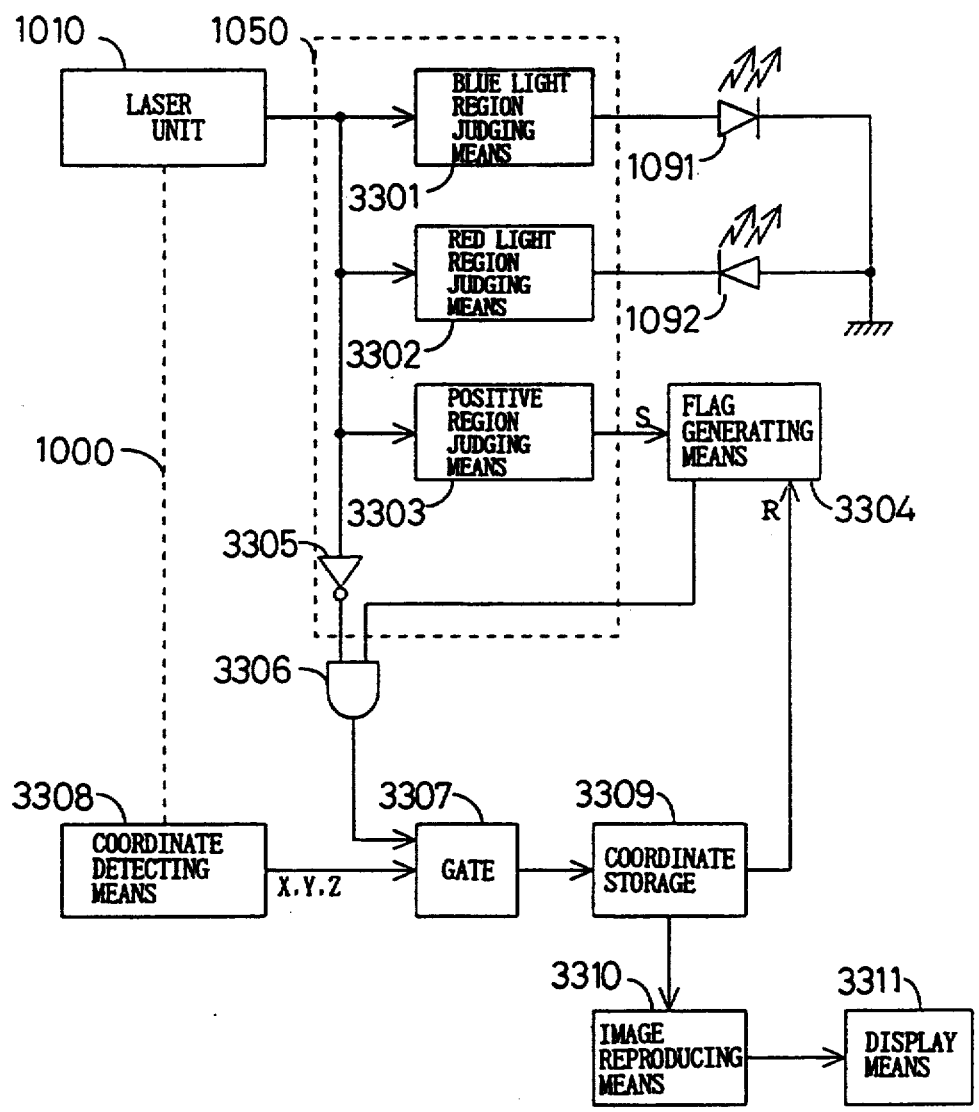
FIG. 33 is a functional block diagram of another embodiment of the present invention.

A functional block diagram of another embodiment of the present invention which executes such processing is illustrated in FIG. 33. Referring to FIG. 33, like reference numerals to those of FIG. 31 denote like or equivalent portions, and accordingly, description thereof is omitted herein. A positive region judging means 3303 judges, using output data of the laser unit 1010 whether or not the position of the subject for measurement is within the range from the reference point to the plus side distance measurement limit. In the case of an affirmative judgment, the positive region judging means 3303 energizes flag generating means 3304 to set the flag F to "1" (generate a flag). An AND gate 306 is opened by the generation of a flag.

An invertor 3305 generates an output when the subject-for measurement approaches nearer than the reference point. Accordingly, when the subject for measurement approaches nearer than the reference point after generation of a flag, an output is generated from the AND gate 3306 so that a gate 3307 is opened, and consequently, coordinate data outputted from the coordinate detecting means 3308 are outputted to coordinate storage means 3309. The coordinate storage means 3309 deenergizes, after the coordinate data have been stored, the flag generating means 3304 to stop generation of a flag.

In this manner, in the present example, since double detection of coordinate data by excessive approach to the subject for measurement is prevented, lighting of the red LED 1092 need not particularly be performed. Further, while it is described that the blue LED 1091 and the red LED 1092 are provided on the laser light protective goggles 1090, the blue LED 1091 and the red LED 1092 may be disposed at any position only if the blue LED 1091 and the red LED 1092 can be visually observed simultaneously while laser light irradiated from the laser unit 10 upon the subject form measurement is watched. In particular, they may be provided, for example, in the proximity of the subject for measurement.

While position control of the laser unit 1010 can be performed simply if the measuring person visually observes an illuminated condition wherein the blue LED 1091 and the red LED 1092 are illuminated, the measuring person must always visually observe laser light irradiated from both the laser unit 1010 upon the subject for measurement and the blue LED 1091 and the red LED 1092.

Figure 34:
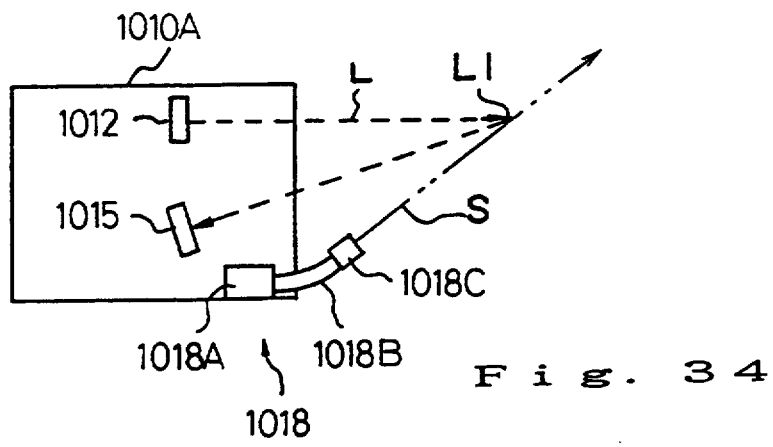
FIG. 34 is a schematic view showing another example of a laser unit.

On the other hand, in the example described below, position control of the laser unit 1010 can be performed simply only by visual observation only of a portion in the proximity of a coordinate measurement position of the subject for measurement. FIG. 34 is a schematic view showing another example of a laser unit. Referring to FIG. 34, like reference characters to those of FIG. 16 denote like or equivalent portions. As is apparent from FIG. 34, an auxiliary light source apparatus 1018 is provided in the present laser unit 1010A. The auxiliary light source apparatus 1018 includes an auxiliary light source (for example a high brightness LED) 1018A, a light introducing fiber 1018B and a lens 1018C. The lens 1018C is mounted such that it does not interfere with a route of laser light incoming to the light position detecting element 1015, and is constructed and mounted such that it converts light S radiated from the auxiliary light source 1018A into substantially parallel light similar to the laser light L irradiated from the semiconductor laser 1012 and the light S is irradiated upon the reference point L1.

Figure 35:
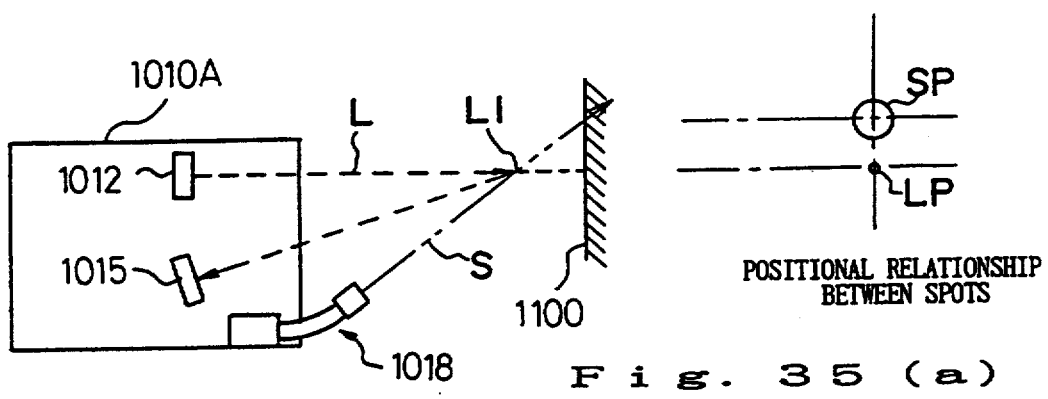
FIGS. 35(a), 35(b) and 35(c) are views illustrating a positional relationship of the laser unit as it is moved toward a subject for measurement and a relationship between spots of laser light and auxiliary light irradiated upon the subject for measurement.
Figure 35:
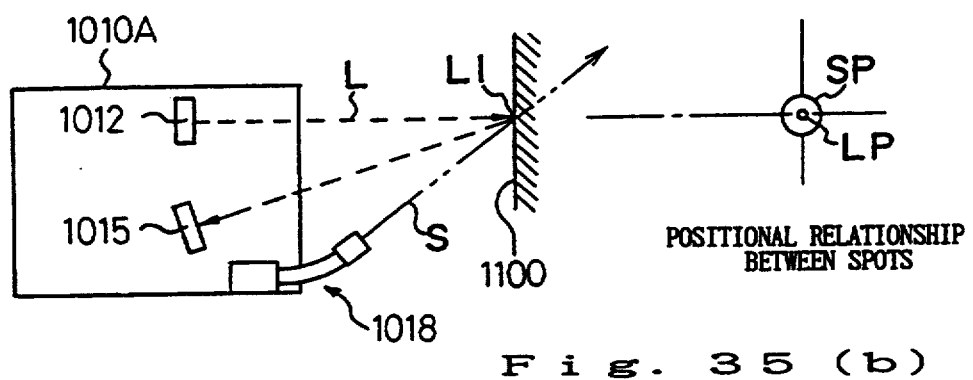
Figure 35:
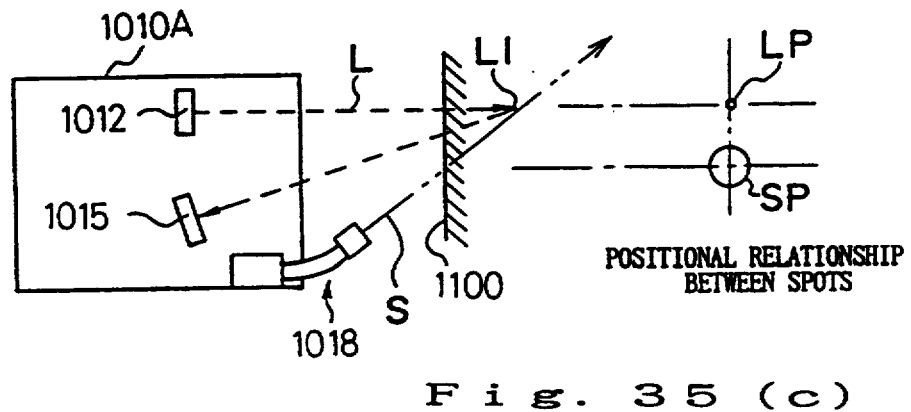

A positional relationship between the laser unit 1010A and the subject 1100 for measurement when the laser unit 1010A is moved toward the subject 1100 for measurement and a relationship between spots of laser light and auxiliary light irradiated upon the subject 1100 for measurement are illustrated in FIGS. 35(a), 35(b) and 35(c). It is to be noted that the diameters of the spots of laser light and auxiliary light irradiated upon the subject 1100 for measurement are, for example, 0.4 mm and 4 mm, respectively.

First, when the reference point L1 is spaced far away from the surface of the object 1100 for measurement as shown in FIG. 35(a), the spot SP of auxiliary light is at a position different from that of the spot LP of laser light. If the laser unit 1010A is gradually moved from the position toward the subject 1100 for measurement, then the spot SP approaches the spot LP.

When the reference point L1 reaches the surface of the subject 1100 for measurement, the spot SP of auxiliary light moves to (that is, becomes concentrical with) the spot LP so that the center thereof may coincide with the center of the spot LP of laser light as shown in FIG. 35(b). If the laser unit 1010A is moved further from the condition toward the subject 1100 for measurement, then the spot SP moves to the opposite side to that of FIG. 35(a) as shown in FIG. 35(c).

In this manner, if the laser unit 1010A provided with the auxiliary light source 1018 is used, then measurement of coordinates of the subject 1100 for measurement can be performed readily without provision of the blue LED 1091 and the red LED 1092 on the laser light protective goggles 1090. Naturally, in such a measuring method, the position judging method of a laser unit using the blue LED 1091 and the red LED 1092 may be additionally provided.

Figure 38:
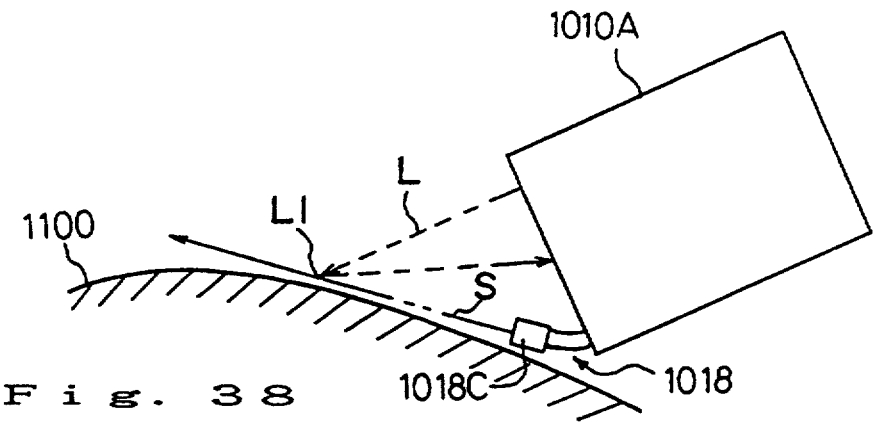
FIG. 38 is a view illustrating a manner wherein an auxiliary light source apparatus interferes.

When the irradiation angle of auxiliary light S with respect to the subject 1100 for measurement is decreased so that the auxiliary light source apparatus 1018 comes to a condition in which it is just before contacting with the subject 1100 for measurement (hereinafter referred to as "interference") as shown in FIG. 38, it is impossible to move the laser unit 1010 any further to the subject 1100 for measurement to effect detection of coordinates. However, if the auxiliary light source apparatus 1018 is made foldable so as to decrease the amount of projection of the auxiliary light source apparatus 1018 from the laser unit 1010, then it is possible to cause the laser unit 1010 to further approach the subject 1100 for measurement. Naturally, in this instance, positioning by using auxiliary light is not performed.

Figure 39:
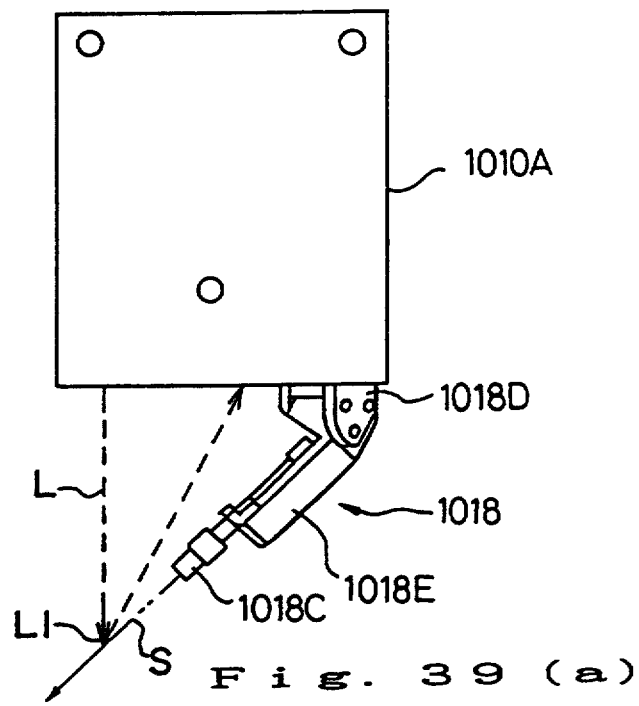
FIG. 39(a) is a view illustrating a condition wherein the auxiliary light source apparatus is erected upright for permitting the auxiliary light to be irradiated upon the reference point L1 and FIG. 39(b) is a bottom plan view of FIG. 39(a)
Figure 39:
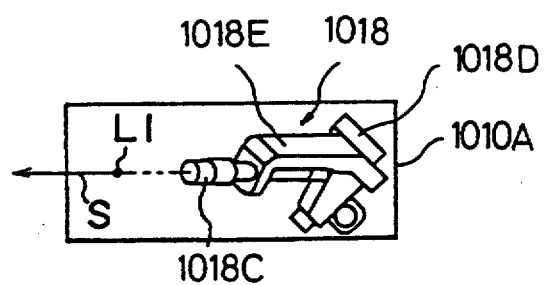
Figure 40:
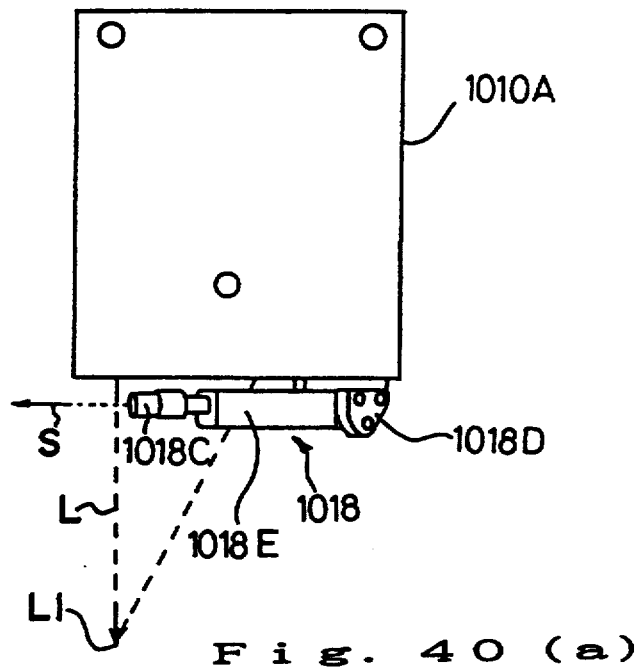
FIG. 40(a) is a view wherein the auxiliary light source apparatus is folded and FIG. 40(b) is a bottom plan view of FIG. 40(a).
Figure 40:
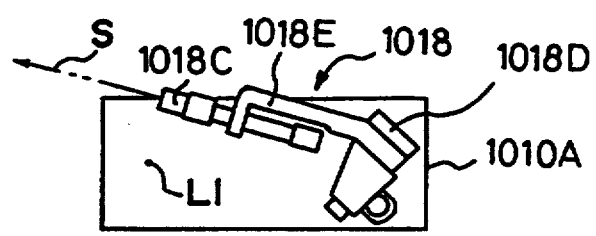

FIGS. 39(a), 39(b), 40(a) and 40(b) are views showing a laser unit 1010A provided with a foldable auxiliary light source apparatus 1018. FIG. 39(a) is a view illustrating a condition wherein the auxiliary light source apparatus 1018 is erected uprightly to irradiate auxiliary light S upon the reference point L1, FIG. 39(b) is a bottom plan view of FIG. 39(a). FIG. 40(a) is a view illustrating a condition wherein the auxiliary light source apparatus 1018 is folded, and FIG. 40(b) is a bottom plan view of FIG. 40(a).

As apparent from FIGS. 39(a) , 39(b) , 40(a) and 40(b), a frame 1018D is securely mounted on a casing of the laser unit 1010A and an arm 1018E on which a lens 1018C for irradiation of auxiliary light S is mounted for pivotal motion on the frame 1018D. The frame 1018D supports the arm 1018E for pivotal motion thereon so that the arm 1018E may be pivoted within a plane different from the plane which includes the irradiation direction L of laser light and the reflection direction of the laser light.

Accordingly, upon interference of the auxiliary light source apparatus 1018, if the arm 1018E is pivoted to the laser unit 1010A side, then the amount of projection of the auxiliary light source apparatus 1018 from the laser unit 1010A can be reduced without interfering with the route of laser light and it is possible to cause the laser unit 1010A to further approach the subject for measurement to effect detection of coordinates.

It is to be noted that, while, in the description regarding FIG. 34, the auxiliary light source 1018A is disposed in the inside of the laser unit 1010A, it is a matter of course that the auxiliary light source 1018A may be mounted outside the laser unit 1010A.

If all coordinates of the subject for measurement can be measured without changing the mounting position of the laser unit 1010 on the horizontal arm 2006 (FIG. 15) at all, then a profile shape of the subject for measurement can be recognized only from a relative positional relationship of the coordinates of the points on the subject for measurement, but since the subject for measurement has a three-dimensional shape, if laser light is irradiated in a certain direction upon the subject for measurement to measure coordinates, for example, on the front surface side of the subject for measurement, then the irradiation direction of the laser light must be changed, for example, to the opposite direction to measure coordinates on the rear surface side of the subject for measurement. When it is attempted to perform measurement of coordinates of the subject for measurement with a higher degree of accuracy, the irradiation direction of laser light must necessarily be changed three or more times.

Here, if the laser unit 1010 is mounted on the wing arm 1020 such that the reference point L1 may be positioned on the crossing point between the center axes of the main shaft 2031 and the auxiliary shaft 2033 as described hereinabove with reference to FIG. 14, then the position of the reference point L1 is not varied even if the wing arm 2020 and/or the intermediate arm 2030 are pivoted to change the irradiation direction of laser light. Accordingly, even if the arms 2020 and 2030 are pivoted, adjustment of the origin of the layout machine 1000 need not be performed every time.

However, when the arms 2020 and 2030 do not have the construction as described above, if the mounting position of the laser unit 10 is changed, then the position of the reference point L1 is displaced by the change, and accordingly, it has been a conventional practice to perform such origin adjustment as described below each time the mounting position of the laser unit 1010 is changed.

In particular, the origin adjustment is performed by making, before measurement of coordinates by the three-dimensional measuring instrument, the reference point of the laser unit coincide with the point marked at a predetermined position of the subject for measurement and setting coordinates (X, Y and Z coordinates) outputted from the layout machine then as the origin. Then, the origin adjustment must be performed each time the mounting position of the laser unit 1010 on the layout machine I is changed.

According to the origin adjustment, if the reference point L1 in the radiation direction of laser light is made to coincide with a marked point which makes an aim, then the X, Y and Z coordinates of the reference point L1 are determined simultaneously. Here, even when the position of the reference point L1 is changed by variation of the irradiation direction of laser light, it is easy to make the reference point coincide with a predetermined point as described hereinabove with reference to FIGS. 14 to 17 if the laser light irradiation direction is directed in the direction of any one of the X, Y and Z axes, and accordingly, also origin adjustment is easy.

However, when the laser light irradiation direction is not directed to any of the X, Y and Z axis directions, in order to make the reference point L1 coincide with the marked point, the laser unit must necessarily be moved simultaneously in the directions of the three axes, and accordingly, positioning thereof is cumbersome. Further, with a non-contacting three-dimensional measuring instrument employing laser light, since detection of coordinates can be performed with a high degree of accuracy, also the positioning described above must be performed accurately, which is cumbersome.

Further, when the subject for measurement is formed from clay and a mark is applied by marking-off to the surface of the subject for measurement, since concave and convex are formed at the marked-off portions, accurate origin adjustment is difficult.

In the following, an origin adjusting method will be described wherein the X, Y and Z coordinates of the origin are successively determined, in a three-dimensional measuring instrument which has such a construction that the position of the reference point L1 is displaced when the irradiation direction of laser light is changed, by adjusting the reference point not to a point but to a predetermined plane in order to solve such a disadvantage as described above. It is to be noted that the present origin adjusting method can be applied to the case wherein the irradiation direction L of laser light irradiated from the laser unit 1010 does not coincide with any one of the X, Y and Z directions as shown in FIGS. 10(a) to 10(c). Accordingly, a portion of an arm (the wing arm 2020 and the intermediate arm 2030) which interconnects the horizontal arm 2006 (FIG. 15) and the laser unit 1010 need not have such a construction as shown in FIG. 14.

Figure 36:
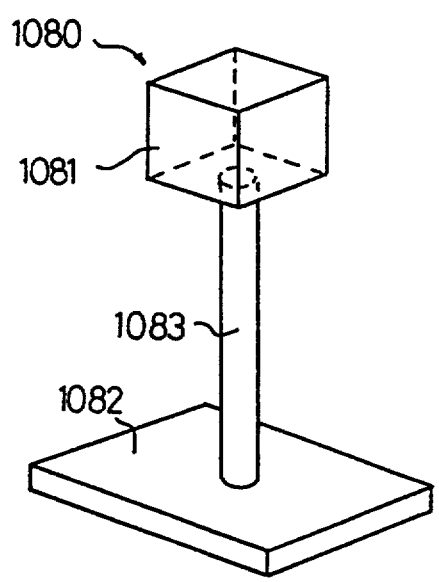
FIG. 36 is a perspective view of a reference cube.

FIG. 36 is a perspective view of a reference cube 1080 for use with the origin adjusting method described above. Referring to FIG. 36, a support bar 1083 is implanted on a frame 1082, and a cube 1081 is placed on the support bar 1083. The cube 1081 is a parallelepiped, wherein the flatness, the parallelism and the perpendicularity of and between the five faces thereof except the lower face are accurately set. Further, the upper face of the cube 1081 is set in parallel to the bottom face of the frame 1082. The reference cube 1080 is placed on a surface plate 2000 as shown in FIG. 15. It is to be noted that the support bar 1083 described above is provided when the layout machine 1000 cannot be lower than the reference point of the laser unit 1010 by very much. Accordingly, when the reference point can be lowered to a position in the proximity of the surface plate 2000, in particular, even when the cube 1081 is placed directly on the surface plate 2000, if the reference point L1 can be moved with respect to the five faces of the cube 1081 except the bottom face, then the support bar 1083 and the frame 1082 are unnecessary.

Figure 37:
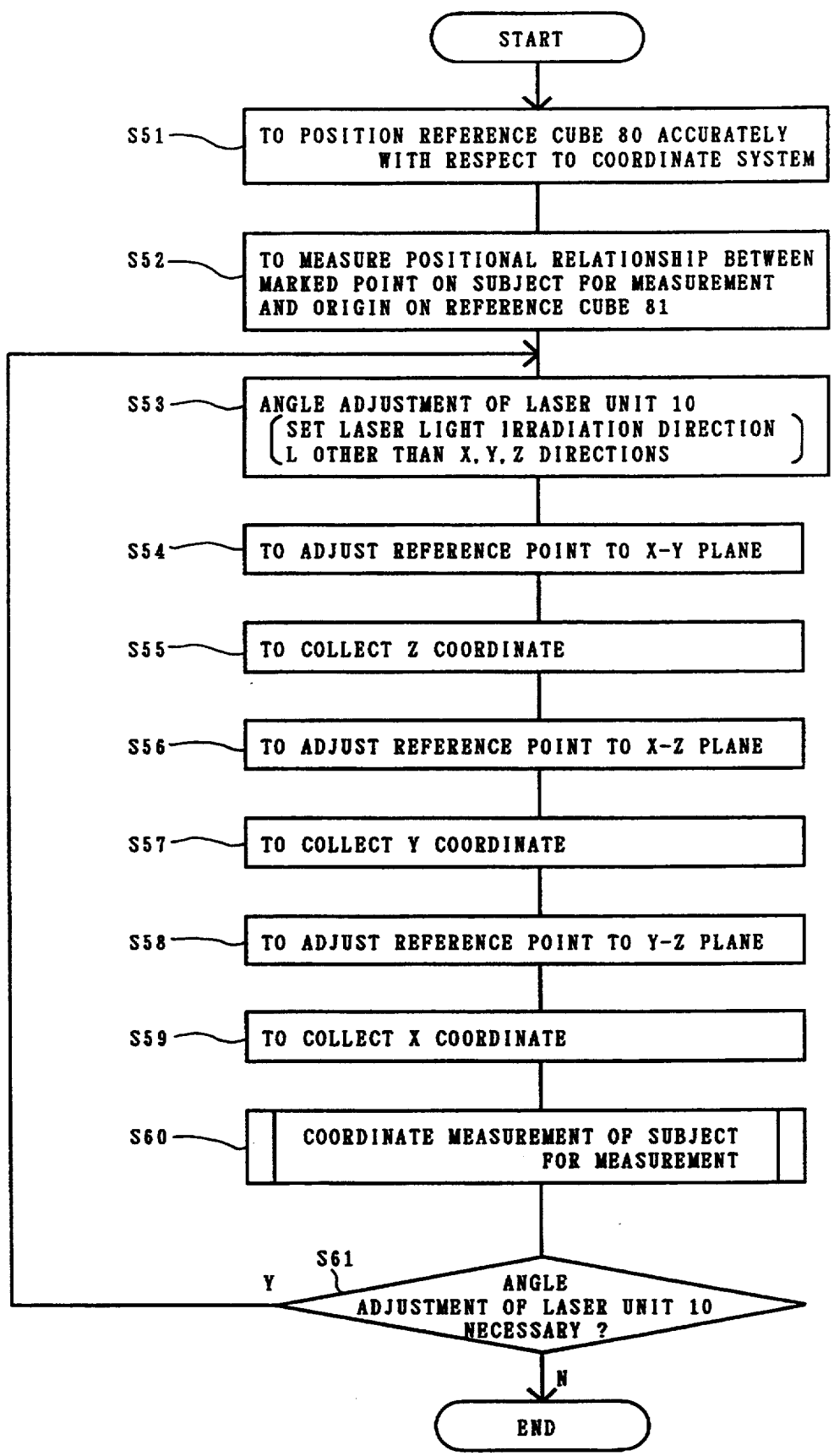
FIG. 37 is a flow chart illustrating an origin adjusting technique using the reference cube and a technique for measurement of coordinates of a subject for measurement using the technique.

FIG. 37 is a flow chart illustrating an origin adjusting technique using the reference cube 1080 and a technique of measuring coordinates of a subject for measurement using the technique. First, at step S51 the reference cube 1080 is positioned accurately with respect to a coordinate system defined by the layout machine 1000 (FIG. 15). Particularly, the placement of the reference cube 1080 on the surface plate 2000 is performed at a position at which it does not interfere with measurement of coordinates of a subject for measurement (not shown) so that the five faces of the cube 1081 except the lower face may be individually parallel to the X-Y plane, the X-Z plane and the Y-Z plane defined by the layout machine 1000 (FIG. 15). One of the eight corners, points, of the cube 1081 makes the origin.

At step S52, the positional relationship between a point (hereinafter referred to as "marked point") marked in advance on the subject for measurement by marking-off or the like and the origin is measured by a suitable method.

At step S53, angle adjustment of the laser unit 1010 is performed so that the laser light irradiation direction L may be directed in a direction other than the directions of the X, Y and Z axes. By such a setting, it is possible to irradiate laser light upon three adjacent faces (the X-Y plane, the X-Z plane and the Y-Z plane) of the reference cube 1080 except the lower face.

At step S54, laser light is irradiated upon the X-Y plane to adjust the reference point L1 to the plane. And at step S55, a Z coordinate outputted from the layout machine 1000 then is fetched. Similarly, at steps S56 and S57 as well as S58 and S59, the reference point L1 is adjusted to the X-Z plane and the Y-Z plane, and a Y coordinate and an X coordinate outputted from the layout machine 1000 then are collected. Coordinates of the origin are determined using the X, Y and Z coordinates obtained by the processing at those steps S54 to S59 as well as, where necessary, lengths of the sides of the cubes 1081.

At step S60, measurement of coordinates of the subject for measurement are executed. Coordinates thus measured are modified using the coordinates of the origin detected at steps S54 to S59. At step S61, it is judged whether or not it is necessary to perform adjustment of the angle of the laser unit 1010. If the angle adjustment is necessary, the processing returns to step S53. However, if there is no necessity of angle adjustment, then the processing comes to an end.

Since coordinates of the origin can be detected only by adjusting the reference point L1 of laser light to three adjacent faces of the reference cube 1080, even when the laser light irradiation direction is not directed in any of the coordinate axes, adjustment of the origin is easy. In particular, since only the reference point L1 is made to coincide with one face of the cube 81, even if laser light is not directed to any of the directions of the three axes, it is possible to position the reference point L1 to an aimed face by moving the laser unit 1010 in one of the directions of the coordinate axes. Accordingly, the adjustment of the origin can be performed readily comparing with the conventional technique wherein the reference point is made coincide with a marked point.

It is to be noted that the processing at step S2 described above can be omitted. Further, while it is described that the five faces of the cube 1081 except the lower face are used, if laser light can be radiated upwardly, then coordinates of the origin can naturally be determined using the bottom face of the cube 1081.

With the non-contacting three-dimensional measuring instrument according to the present invention, since the laser light irradiation direction can be directed to all of the directions of the three axes constituting the coordinate system, if laser light is irradiated in advance upon a desired position of a subject for measurement, then the reference point can be moved to the desired position only by moving the laser unit in the laser light irradiation direction. Accordingly, detection of coordinates of the aimed position of the subject for measurement can be performed readily.

With the non-contacting three-dimensional measuring instrument according to the present invention, since the position of the reference point is not varied even if the irradiation direction of laser light is varied, adjustment of the origin need not be performed each time the irradiation direction is varied. Accordingly, measurement of coordinates by the non-contacting three-dimensional measuring instrument is easy.

With the non-contacting three-dimensional measuring instrument according to the present invention, since measurement of coordinates can be performed in the proximity of a wall face of a recessed portion of the surface of the subject for measurement, measurement of the inside of the recessed portion can be performed readily and with a high degree of accuracy. In other words, interference is small even at a recessed portion and the range in which measurement can be performed is wide.

With the non-contacting three-dimensional measuring instrument according to the present invention, since the first intermediate arm can be constructed light in weight and strong, the structure of a layout machine on which the first intermediate arm, the laser unit and other members are mounted need not be made specifically strong. The non-contacting three-dimensional measuring apparatus can be constructed using a ready made layout machine as is applied to a contacting three-dimensional measuring instrument which employs a needle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A non-contacting three-dimensional measuring instrument which includes an arm movable in the directions of axes of coordinates of a rectangular coordinate system, a laser unit mounted on said arm for detecting a distance to a subject for measurement, and coordinate detecting means for detecting coordinates of said arm comprising:

a first shaft mounted on said arm;

a main shaft directly secured to said first shaft for rotation relative to said arm such that the direction of a center axis of said main shaft is directed in a direction of one of the axes of coordinates;

a first intermediate arm provided for pivotal motion on said main shaft;

an auxiliary shaft provided on said first intermediate arm such that it makes an angle of 45 degrees with respect to said main shaft;

a second intermediate arm provided for pivotal motion on said auxiliary shaft; and laser unit mounting means for mounting said laser unit on said second intermediate arm for positioning the direction of laser light irradiated from said laser unit to make an angle of approximately 45 degrees with respect to said auxiliary shaft.

2. The non-contacting three-dimensional measuring instrument according to claim 1, wherein said laser unit mounting means mounts said laser unit on said second intermediate arm such that a reference point at a predetermined distance in the laser light irradiation direction is positioned at a crossing point between said main shaft and said auxiliary shaft.

3. The non-contacting three-dimensional measuring instrument according to claim 1, wherein said laser unit is constructed so as to irradiate laser light from a position other than a central portion thereof, and that said laser unit mounting means can mount said laser unit reversely with regard to a front and rear sides.

4. The non-contacting three-dimensional measuring instrument according to claim 1, wherein said first intermediate arm includes a core member made of a pair of epoxy honeycomb members of an annular shape adhered in an opposing relationship to each other, a pair of bearings disposed at the opposite ends of said core member, and carbon fibers wound on the surfaces of said core member and said bearings.

5. The non-contacting three-dimensional measuring instrument according to claim 1, wherein said laser unit includes a light emitting portion and a light receiving portion for irradiating laser light upon a detection point of a subject for measurement and receiving laser light reflected from the detection point to recognize the distance to the detection point.

6. The non-contacting three-dimensional measuring instrument according to claim 5, and further including coordinate detecting means for detecting coordinates of said arm, and wherein coordinates of a detection point are recognized in accordance with the coordinates of said arm when the positional relationship between the detection point and said laser unit reaches a predetermined relationship.

7. The non-contacting three-dimensional measuring instrument according to claim 5, wherein said laser unit includes needle-like indicating means for indicating the crossing point between extension lines of an optic axis of laser light radiated from said light emitting portion and an optic axis of laser light received by said light receiving portion when the detection point and said laser unit reach the predetermined positional relationship.

8. The non-contacting three-dimensional measuring instrument according to claim 7, wherein said needle-like indicating means is readily, removably secured to said laser unit.

9. The non-contacting three-dimensional measuring instrument according to claim 7, wherein said needle-like indicating means includes a base plate secured to said laser unit, a supporting portion having a tapping hole and being secured to said base plate with a comparatively weak holding force, and a needle screwed in said tapping hole of said supporting portion.

10. The non-contacting three-dimensional measuring instrument according to claim 9, wherein said base plate and said supporting portion are secured to each other by a magnetic force.

11. The non-contacting three-dimensional measuring instrument according to claim 7, wherein said needle-like indicating means is disposed so that laser light is irradiated at an end portion thereof.

12. The non-contacting three-dimensional measuring instrument according to claim 7, wherein said needle-like indicating means is constructed from a transparent material.

13. The non-contacting three-dimensional measuring instrument according to claim 12, wherein an end portion of said needle-like indicating means is processed by craping.

14. The non-contacting three-dimensional measuring instrument according to claim 7, wherein said needle-like indicating means is installed within a region defined between the extension lines of the optic axis of laser light radiated from said light emitting portion and the optic axis of laser light received by said light receiving portion when the detection point and said laser unit are in the predetermined positional relationship.

* * * * *